(12) United States Patent
Chen

(10) Patent No.: US 12,063,190 B2
(45) Date of Patent: Aug. 13, 2024

(54) NOTETAKING AND HIGHLIGHTING MESSAGES WITHIN CHAT CHANNELS

(71) Applicant: Zoom Video Communications, Inc., San Jose, CA (US)

(72) Inventor: Tania Sung-Yi Chen, Cupertino, CA (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

(21) Appl. No.: 18/083,857

(22) Filed: Dec. 19, 2022

(65) Prior Publication Data

US 2024/0205177 A1    Jun. 20, 2024

(51) Int. Cl.
*H04L 51/046* (2022.01)
*G06F 3/0484* (2022.01)
(Continued)

(52) U.S. Cl.
CPC .......... *H04L 51/046* (2013.01); *G06F 3/0484* (2013.01); *G06F 40/166* (2020.01); *G06F 40/40* (2020.01); *H04L 51/216* (2022.05); *H04L 51/224* (2022.05); *H04L 65/403* (2013.01); *G06F 3/0482* (2013.01); *H04L 12/1813* (2013.01)

(58) Field of Classification Search
CPC ............. H04L 12/1822; H04L 12/1813; H04L 51/046; H04L 51/224; H04L 51/216
See application file for complete search history.

(56) References Cited

U.S. PATENT DOCUMENTS

| 7,124,164 B1 * | 10/2006 | Chemtob | ............ | H04L 12/1822 |
| | | | | 709/204 |
| 8,510,646 B1 * | 8/2013 | Young | ................... | G06F 40/169 |
| | | | | 715/275 |

(Continued)

OTHER PUBLICATIONS

"How Can I Send a Chat Message During the Zoom Meeting?", Available online at: https://www.myerberg.org/news-events/news/ufaqs/how-can-i-send-a-chat-message-during-the-zoom-meeting/, Oct. 18, 2021, 3 pages.

(Continued)

*Primary Examiner* — Barbara B Anyan
(74) *Attorney, Agent, or Firm* — Kilpatrick Townsend & Stockton LLP

(57) ABSTRACT

Systems and methods for notetaking and generating annotated message(s) within a chat channel are provided. In an Example, a method includes establishing, by a video conference provider, a first chat channel for exchanging chat messages between a plurality of client devices and receiving, by the video conference provider, an indication from a first client device to generate a note corresponding to one or more messages within the first chat channel. The plurality of client devices may include the first client device and the indication may include note content. The method may also include generating, by the video conference provider, one or more notes including the note content corresponding to the one or more messages within the first chat channel based on the indication and storing, by the video conference provider, the one or more notes corresponding to the one or more messages within the first chat channel.

15 Claims, 13 Drawing Sheets

(51) Int. Cl.
    *G06F 40/166*     (2020.01)
    *G06F 40/40*     (2020.01)
    *H04L 51/216*     (2022.01)
    *H04L 51/224*     (2022.01)
    *H04L 65/403*     (2022.01)
    *G06F 3/0482*     (2013.01)
    *H04L 12/18*     (2006.01)

(56) References Cited

U.S. PATENT DOCUMENTS

| | | | |
|---|---|---|---|
| 10,530,731 B1* | 1/2020 | Wu | H04L 51/046 |
| 10,904,193 B1* | 1/2021 | Al Majid | H04L 51/224 |
| 10,913,004 B1* | 2/2021 | Wu | A63F 13/48 |
| 2004/0260770 A1* | 12/2004 | Medlin | H04L 12/1813 |
| | | | 709/204 |
| 2010/0131866 A1 | 5/2010 | Nielsen et al. | |
| 2015/0121190 A1* | 4/2015 | Miyamoto | H04L 51/216 |
| | | | 715/230 |
| 2021/0306288 A1* | 9/2021 | Boyd | G06F 3/04817 |
| 2022/0092518 A1* | 3/2022 | Choi | G06Q 10/063112 |
| 2023/0161737 A1* | 5/2023 | Madisetti | G06F 16/1815 |
| | | | 707/608 |

OTHER PUBLICATIONS

U.S. Appl. No. 18/083,853, "Non-Final Office Action", Aug. 25, 2023, 10 pages.
Co-pending U.S. Appl. No. 18/083,853, filed Dec. 19, 2022, 69 pages.

* cited by examiner

NOTETAKING AND HIGHLIGHTING MESSAGES WITHIN CHAT CHANNELS

CROSS REFERENCE TO RELATED APPLICATIONS

This application is related to U.S. patent application Ser. No. 18/083,853, filed Dec. 19, 2022, titled "Notetaking and Highlighting Messages Within Chat Channels."

FIELD

The present application generally relates to videoconferences and chat channels, and more particularly relates to systems and methods for notetaking and generating annotated message(s) within a chat channel.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
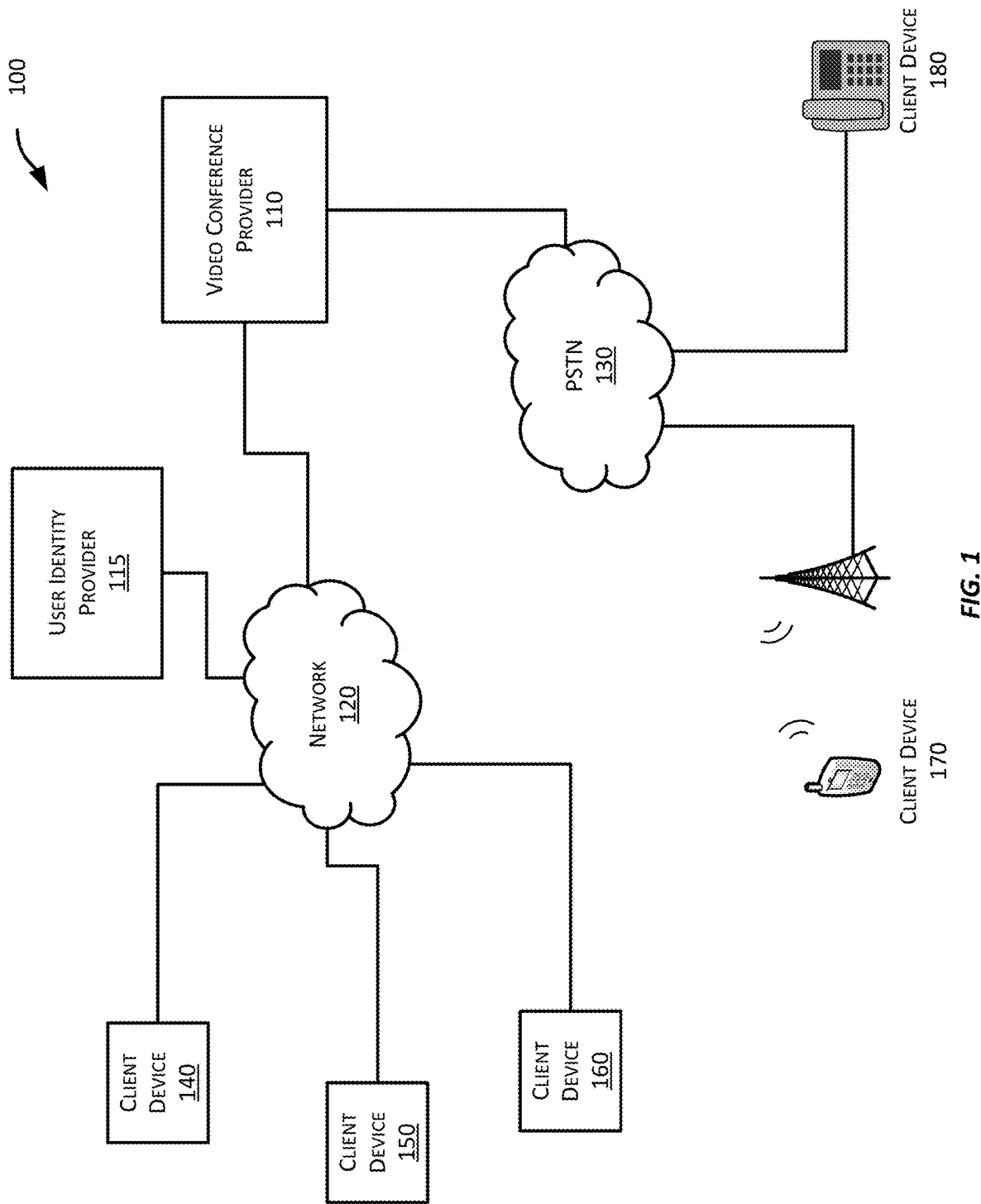
FIGS. 1 and 2 show example systems for notetaking and generating annotated message(s) within a chat channel, according to an embodiment herein.

Examples are described herein in the context of systems and methods for notetaking and generating annotated message(s) within a chat channel. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Chat messaging has become a fixture of modern communication. In particular, chat channels are used across numerous platforms, especially within work environments as a means of providing swift and easy communication between individuals. A chat channel involves an application that allows multiple participants to exchange messages, including sharing documents, text messages, audio clips, etc., with other members of the chat channel. Unlike email communication, however, a chat channel generates a running dialogue of messages that are exchanged within the chat channel. As such, chat channels can accumulate thousands of messages, especially, if the chat channel involves a high number of members. The high volume of messages within a chat channel can make it cumbersome for members to identify relevant or important information within the chat channel. Further, it can be difficult to return to that information at a later time, particularly if many chat messages are posted between the important message was posted.

To provide chat channel members the ability to identify and review important and relevant content within a chat channel, as well as add relevant notes to content within the chat channel, examples systems and methods for notetaking and generating annotated messages within a chat channel are provided herein. As described herein, a chat channel member can annotate one or more chat messages within the chat channel to highlight content, flag content, or tag someone to the content. In some embodiments, a chat channel member can generate a note or take notes associated with a chat message. By allowing a chat channel member to annotate messages or add his or her own notes to the message within the chat channel, the chat channel member can quickly review, identify, and access important and relevant content within a chat channel.

Not only can a single chat channel become overwhelmed with the volume of content within the chat channel, but members can become overwhelmed by being part of numerous chat channels. For example, a single member may be part of a dozen or more chat channels, each containing a high volume of messages and content. For the purposes of this disclosure, this type of member may be referenced as a multi-channel member. Not only would it be time consuming, but it could even be impossible for a multi-channel member to identify the most recent and relevant information for each of the channels, especially when content is continuously being updated and generated.

To provide a chat channel member easy access and review of annotated messages and notes generated across numerous chat channels, example notetaking panels are provided herein. A notetaking panel may aggregate the annotated messages and notes (e.g., "notetaking content") generated from across one or more chat channels in a simple display for ease of review and access. By aggregating the annotated messages or notes generated across numerous chat channels in a single place, the multi-channel member can easily review the notetaking content of each channel, as well as easily access the content within the relevant chat channel simply upon selecting the notetaking content. Moreover, the multi-channel member can compare or even add notetaking content across multiple channels from a single interface.

This illustrative example is given to introduce the reader to the general subject matter discussed herein and the disclosure is not limited to this example. The following sections describe various additional non-limiting examples and examples of systems and methods for notetaking and generating annotated message(s) within a chat channel.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the chat and video conference provider 110. For example, the chat and video conference provider 110 can be located within a private network to provide video conferencing services to devices within the private network, or it can be connected to a public network, e.g., the internet, so it may be accessed by anyone. Some examples may even provide a hybrid model in which a video conference provider 110 may supply components to enable a private organization to host private internal video conferences or to connect its system to the chat and video conference provider 110 over a public network.

The system optionally also includes one or more user identity providers, e.g., user identity provider 115, which can provide user identity services to users of the client devices 140-160 and may authenticate user identities of one or more users to the chat and video conference provider 110. In this example, the user identity provider 115 is operated by a different entity than the chat and video conference provider 110, though in some examples, they may be the same entity.

Figure 2:
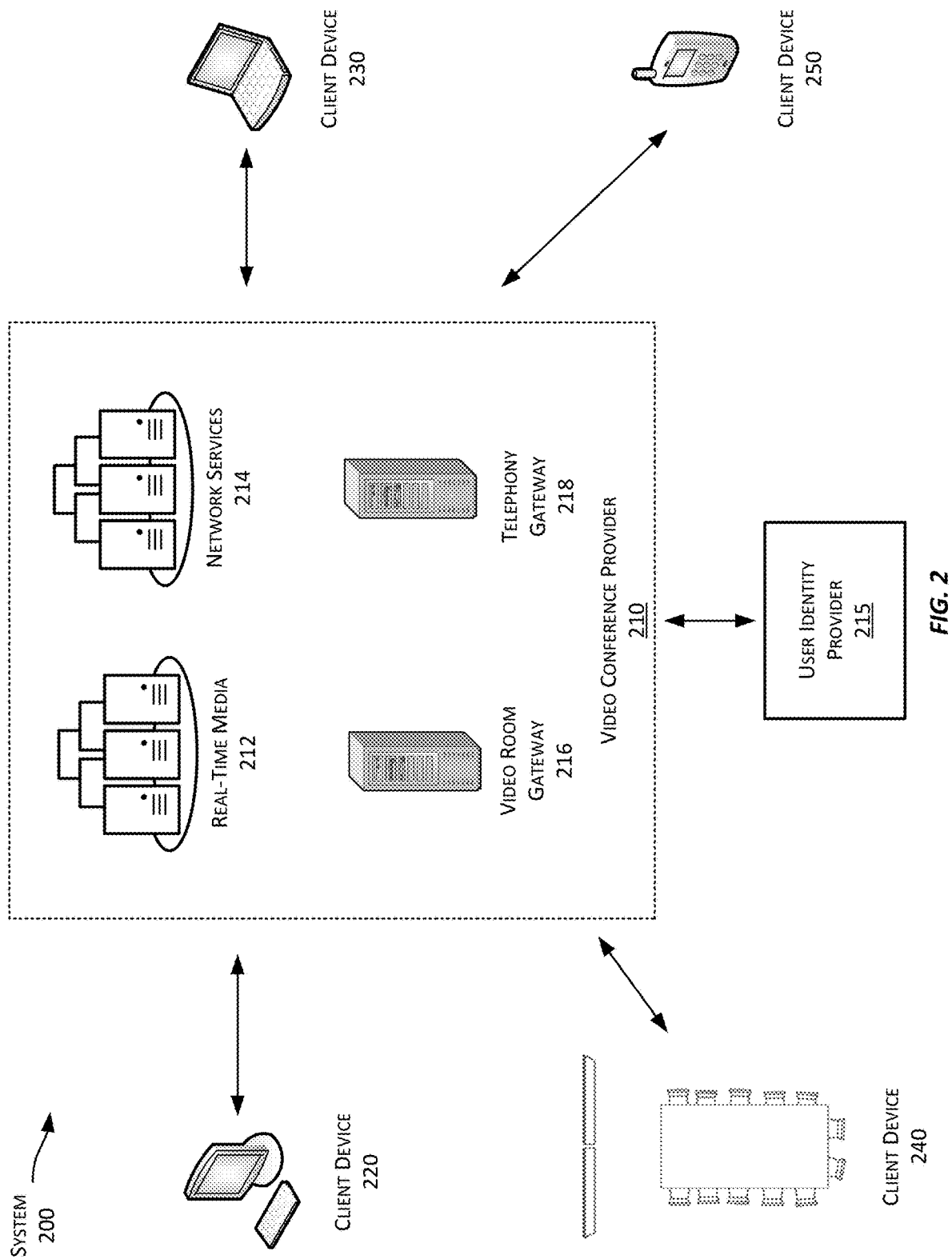

Video conference provider 110 allows clients to create videoconference meetings (or "meetings") and invite others to participate in those meetings as well as perform other related functionality, such as recording the meetings, generating transcripts from meeting audio, generating summaries and translations from meeting audio, manage user functionality in the meetings, enable text messaging during the meetings, create and manage breakout rooms from the virtual meeting, etc. FIG. 2, described below, provides a more detailed description of the architecture and functionality of the chat and video conference provider 110. It should be understood that the term "meeting" encompasses the term "webinar" used herein.

Meetings in this example video conference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used.

To create a meeting with the chat and video conference provider 110, a user may contact the chat and video conference provider 110 using a client device 140-180 and select an option to create a new meeting. Such an option may be provided in a webpage accessed by a client device 140-160 or client application executed by a client device 140-160. For telephony devices, the user may be presented with an audio menu that they may navigate by pressing numeric buttons on their telephony device. To create the meeting, the chat and video conference provider 110 may prompt the user for certain information, such as a date, time, and duration for the meeting, a number of participants, a type of encryption to use, whether the meeting is confidential or open to the public, etc. After receiving the various meeting settings, the chat and video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started or the host may be required to specifically admit one or more of the users.

During the meeting, the participants may employ their client devices 140-180 to capture audio or video information and stream that information to the chat and video conference provider 110. They also receive audio or video information from the chat and video conference provider 210, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The chat and video conference provider 110 may also invalidate the meeting information, such as the meeting identifier or password/passcode.

To provide such functionality, one or more client devices 140-180 may communicate with the chat and video conference provider 110 using one or more communication networks, such as network 120 or the public switched telephone network ("PSTN") 130. The client devices 140-180 may be any suitable computing or communications device that have audio or video capability. For example, client devices 140-160 may be conventional computing devices, such as desktop or laptop computers having processors and computer-readable media, connected to the chat and video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the chat and video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the chat and video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can making conventional telephone calls and is not limited solely to dedicated telephony devices like conventional telephones.

Referring again to client devices 140-160, these devices 140-160 contact the chat and video conference provider 110 using network 120 and may provide information to the chat and video conference provider 110 to access functionality provided by the chat and video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the chat and video conference provider 110.

A user identity provider 115 may be any entity trusted by the chat and video conference provider 110 that can help identify a user to the chat and video conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 115 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the chat and video conference provider 110.

When the user accesses the chat and video conference provider 110 using a client device, the chat and video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the chat and video conference provider 110 either provides or denies access to its services, respectively.

For telephony devices, e.g., client devices 170-180, the user may place a telephone call to the chat and video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the chat and video conference provider 110. For example, telephony devices may be unable to provide user identification information to identify the telephony device or the user to the chat and video conference provider 110. Thus, the chat and video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the chat and video conference provider 110, even in cases where the user has an authenticated identity and employs a client device capable of identifying the user to the chat and video conference provider 110. The chat and video conference provider 110 may determine whether to allow such anonymous users to use services provided by the chat and video conference provider 110. Anonymous users, regardless of the reason for anonymity, may be restricted as discussed above with respect to users employing telephony devices, and in some cases may be prevented from accessing certain meetings or other services, or may be entirely prevented from accessing the chat and video conference provider 110.

Referring again to video conference provider 110, in some examples, it may allow client devices 140-160 to encrypt their respective video and audio streams to help improve privacy in their meetings. Encryption may be provided between the client devices 140-160 and the chat and video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the chat and video conference provider 110, while allowing the chat and video conference provider 110 to access the decrypted multimedia streams to perform certain processing, such as recording the meeting for the participants or generating transcripts of the meeting for the participants. End-toend encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the chat and video conference provider 110. Further, such a system enables users to use a wide variety of different client devices 140-180 from traditional standards-based video conferencing hardware to dedicated video conferencing equipment to laptop or desktop computers to handheld devices to legacy telephony devices. etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the chat and video conference provider 210 over a communications network, such as the internet for client devices 220-240 or the PSTN for client device 250, generally as described above with respect to FIG. 1. The chat and video conference provider 210 is also in communication with one or more user identity providers 215, which can authenticate various users to the chat and video conference provider 210 generally as described above with respect to FIG. 1.

In this example, the chat and video conference provider 210 employs multiple different servers (or groups of servers) to provide different Examples of video conference functionality, thereby enabling the various client devices to create and participate in video conference meetings. The chat and video conference provider 210 uses one or more real-time media servers 212, one or more network services servers 214, one or more video room gateways 216, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the chat and video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the chat and video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the chat and video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the chat and video conference provider 210 may allow a meeting participant to notify it of inappropriate behavior or content in a meeting. Such a notification may trigger the real-time media servers to 212 record a portion of the meeting for review by the chat and video conference provider 210. Still other functionality may be implemented to take actions based on the decrypted multimedia streams at the chat and video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the chat and video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the chat and video conference provider under a supervisory set of servers. When a client device 220-250 accesses the chat and video conference provider 210, it will typically communicate with one or more network services servers 214 to access their account or to participate in a meeting.

When a client device 220-250 first contacts the chat and video conference provider 210 in this example, it is routed to a network services server 214. The client device may then provide access credentials for a user, e.g., a username and password or single sign-on credentials, to gain authenticated access to the chat and video conference provider 210. This process may involve the network services servers 214 contacting a user identity provider 215 to verify the provided credentials. Once the user's credentials have been accepted, the network services servers 214 may perform administrative functionality, like updating user account information, if the user has an identity with the chat and video conference provider 210, or scheduling a new meeting, by interacting with the network services servers 214.

In some examples, users may access the chat and video conference provider 210 anonymously. When communicating anonymously, a client device 220-250 may communicate with one or more network services servers 214 but only provide information to create or join a meeting, depending on what features the chat and video conference provider allows for anonymous users. For example, an anonymous user may access the chat and video conference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the mainstage or a breakout room if present, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to remove one or more participants from a meeting, such a command may also be handled by a network services server 214, which may terminate the authorization of the one or more participants for joining the meeting.

In addition to creating and administering on-going meetings, the network services server(s) 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the chat and video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the chat and video conference provider 210. For example, the video conferencing hardware may be provided by the chat and video conference provider to one or more of its subscribers, which may provide access credentials to the video conferencing hardware to use to connect to the chat and video conference provider 210.

The video room gateway servers 216 provide specialized authentication and communication with the dedicated video conferencing hardware that may not be available to other client devices 220-230, 250. For example, the video conferencing hardware may register with the chat and video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the chat and video conference provider 210.

Referring now to the telephony gateway servers 218, these servers 218 enable and facilitate telephony devices' participation in meetings hosed by the chat and video conference provider 210. Because telephony devices communicate using the PSTN and not using computer networking protocols, such as TCP/IP, the telephony gateway servers 218 act as an interface that converts between the PSTN, and the networking system used by the chat and video conference provider 210.

For example, if a user uses a telephony device to connect to a meeting, they may dial a phone number corresponding to one of the chat and video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212 and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the chat and video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

In some embodiments, in addition to the video conferencing functionality describe above, the chat and video conference provider 210 (or the chat and video conference provider 110) may provide a chat functionality. In such examples, the chat and video conference provider 210 may allow a user to create one or more chat channels where the user may exchange messages with other users (e.g., members) that have access to the chat channel(s). The messages may include text, image files, video files, or other files. In some examples, a chat channel may be "open," meaning that any user may access the chat channel. In other examples, the chat channel may require that a user be granted permission to access the chat channel. The chat and video conference provider 210 may provide permission to a user and/or an owner of the chat channel may provide permission to the user. Furthermore, there may be any number of members permitted in the chat channel.

Similar to the formation of a meeting, a chat channel may be provided by a server where messages exchanged between members of the chat channel are received and then directed to respective client devices. For example, if the client devices 220-250 are part of the same chat channel, messages may be exchanged between the client devices 220-240 via the chat and video conference provider 210 in a manner similar to how a meeting is hosted by the chat and video conference provider 210.

Figure 3:
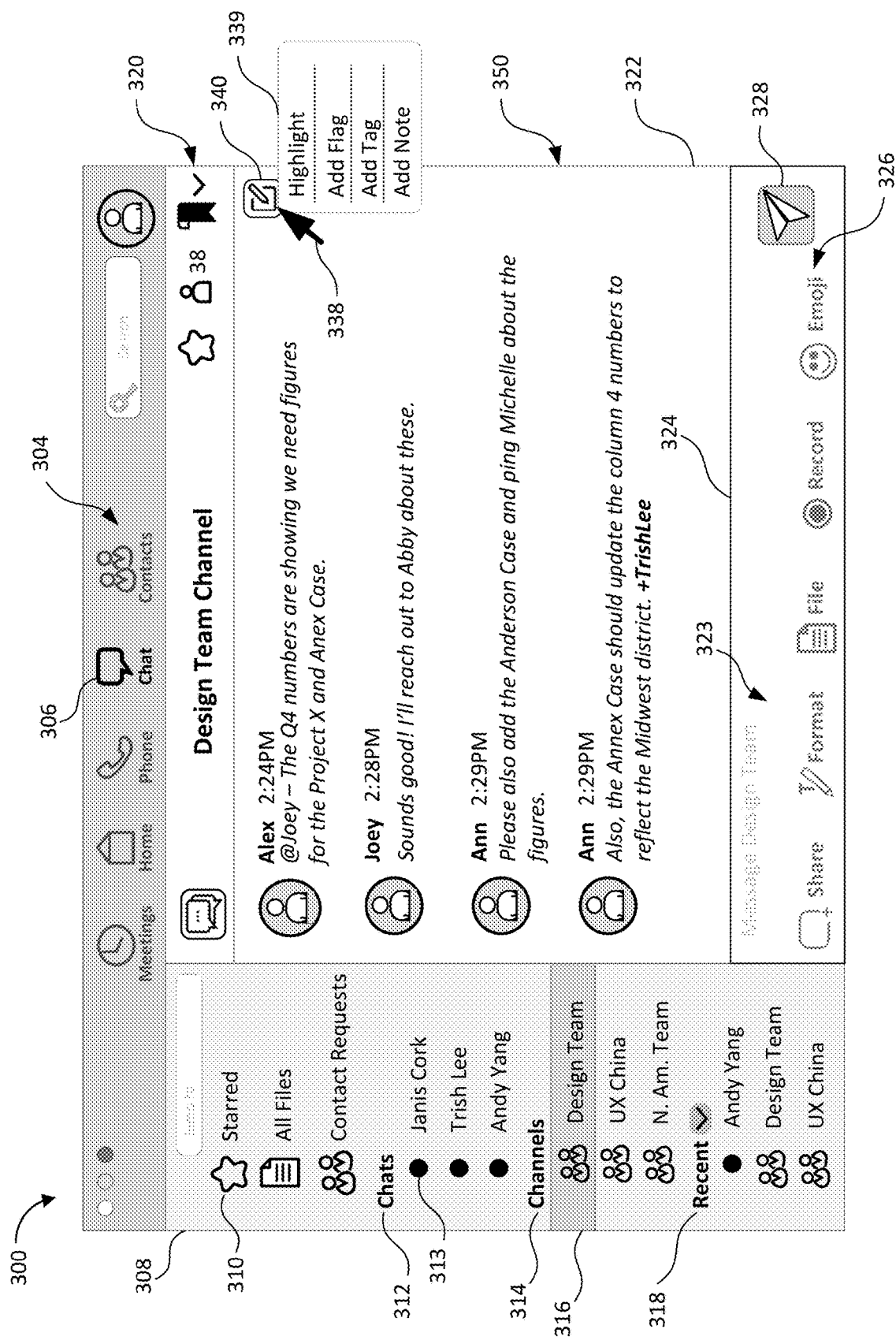
FIG. 3 illustrates an example chat channel, according to an embodiment herein.

Referring now to FIG. 3, FIG. 3 shows a graphical user interface ("GUI") for a master chat panel 300 provided as a part of client software executed by a computing device. The master chat panel 300 provides access to a variety of chat functionality, including multiple chat channels 314 the user has access to. It also provides a view of an example chat channel 316, according to an embodiment herein. The chat channel 316 may be accessible through the master chat panel 300 by selecting a chat channel from the available chat channels. The master chat panel 300 may be displayed on a client device, such as the client device 220, in response to information sent by a chat and video conference provider, such as the chat and video conference provider 110 in FIG. 1. The master chat panel 300 may be generated by an application, e.g., a standalone chat client or integrated into a video conferencing application, run by one or more processors stored on the client device.

The master chat panel 300 may include a general dashboard 304, a chat control dashboard 320, a sidebar 308, a chat window 350, a reply dashboard 326, and a message composure panel 324. The general dashboard 304 may include one or more buttons or links that switch functionalities and/or views of the master chat panel 300. For example, FIG. 3 shows a chat view, perhaps in response to a user command selecting a chat button 306 in the general dashboard 304. In this view, the chat window 350, the message composure panel 324, and other components illustrated in FIG. 3 may be displayed on the client device. In other examples, a contacts button may be selected by a user. In response the contacts button being selected, the chat window 350, the reply dashboard 326 and the message composure panel 324 may be replaced by a display of a contacts window including a list of user contacts associated with the user of the client device. The sidebar 308 may be displayed alongside the contacts window. Other configurations are also possible. Various buttons on the general dashboard 304 may correspond to various displays of windows being displayed on the client device. Any number of components shown in FIG. 3 may be displayed on the client device with any of the various windows. Similarly, any of the components may cease to be displayed in accordance with any of the windows.

The sidebar 308 may include one or more chat channel headings, such as chats 312, channels 314, and recent 318. Chats 312 heading may include one or more chat channels, such as chat channel 313. The chats 312 may include private chat channels, where messages in a chat channel are exchanged in a one-on-one manner. For example, the chat channel 313 may be between the member viewing the master chat panel 300 and one other member, such as Janis Cork, as depicted. Messages exchanged via the chat channel 313 may only be accessible by the members of the chat channel 313. One-on-one chat channels, such as those provided under the chats 312 heading may allow members to securely communicate with each other or track communications between themselves.

The channels 314 heading may be for chat channels that include two or more users. For example, a chat channel 316 may be included under the channels 314 heading because the chat channel 316 is for a Design Team. The chat channel 316 may include two or more members who have access to send and receive messages within the chat channel 316. In some examples, the chat channel 316 may only be accessed by members who have permission to enter the chat channel 316, such as members who receive and accept an invitation to join the chat channel 316. In some embodiments, a chat channel may have a host or member who has host controls over the chat channel. For example, host controls may include the ability to establish and invite members to a chat channel.

The recent 318 heading may indicate chat channels that a viewing member of the master chat panel 300 has recently viewed. The recent 318 heading may allow the viewing member easy access to commonly or recently viewed or accessed chat channels. "Recently accessed" chat channels may be determined by the client device to be a fixed number of most recent channels accessed by the viewing member or may be only those chat channels access within a certain time, calculated from the current time.

Although only the chat channel headings 312, 314, and 318 are shown, other chat channel headings are possible. For example, some examples may include a chat channel heading that displays, on the client device, only those channels that the user associated with the client device is a member of that have been recently accessed.

The sidebar 308 may also include one or more combinatory headings, such as starred combinatory heading 310. A combinatory heading may aggregate one or more messages from one or more chat channels, according to a predetermined criterion. The combinatory headings may include a link that, in response to a user command, cause the client device to display one or more messages in the chat window 350. The messages may be gathered from one or more chat channels, such as the chat channels 312 or 316, and displayed based on predetermined criteria. In FIG. 3, for example, the starred combinatory heading 310 may gather only those messages that have been marked by a user of the client device. The marked messages may be stored at the client device, and/or may be stored at the chat and video conference provider. The link may cause the one or more processors included on the client device to determine which messages are marked messages and cause them to be displayed in the chat window 350. In some examples, the link may cause the client device to send a signal to the chat and video conference provider. The chat and video conference provider may then determine which messages are marked messages and send information to the client device to generate a display of the marked messages in the chat window 350.

Other combinatory headings (and associated links and functionality) are also considered. Other examples may include an unread heading, an all files heading, a contact request heading, and others. As with the starred combinatory heading 310, an associated link may cause the client device and/or the chat and video conference provider to determine which messages (if any) meet predetermined criteria associated with the combinatory heading and subsequently display those messages on the client device.

As depicted, a viewing participant of the master chat panel 300 may select to access the chat channel 316 for the Design Team. Upon selection of the chat channel 316, the chat window 350 may be provided on the master chat panel 300. The chat window 350 may include the chat control dashboard 320. The chat control dashboard 320 may display one or more control buttons and/or information regarding the chat channel 316 (e.g., the currently viewed chat channel). The control buttons may include links that mark a message (e.g., to mark it such that it is determined to be a marked message via the starred combinatory heading 310), begin a video conference, schedule a meeting, create a video message, or other tasks. The chat control dashboard 320 may also include a title of the chat channel 316 currently being displayed on the client device, such as the "Design Team Channel" as depicted, and/or a number of users with access to the chat channel 316. One of ordinary skill in the art would recognize many different possibilities and configurations.

The chat window 350 may also include a message composure panel 324. The message composure panel 324 may include an input field 323, where the member can input a message and select to send the message to the chat channel 316. The input field 323 may be accessed by a peripheral device such as a mouse, a keyboard, a stylus, or any other suitable input method. In some examples, the input field 323 may be accessed by a touchscreen or other system built into the client device. In some examples, a notification may be sent from the client device and/or the chat and video conference provider that indicates a response is being entered into the input field 323 by the user. In other examples, no notification may be sent.

The reply dashboard 326 may include one or more buttons that, in response to a user command edit or modify a response input into the input field 323. For example, a record button may be provided, that allows the client device to capture audio and video. In other examples, there may be a share button that causes the client device to send the message to a different chat channel. In yet another example, there may be a reaction button that causes an image to be sent by the client device to the chat channel in response to a message posted in the chat channel.

In some examples, there may be one or more formatting buttons included on the reply dashboard 326. The one or more formatting buttons may change the appearance of a reply entered in the input field 323. The user may thereby edit and customize their response in the input field 323 before sending.

The reply dashboard 326 may include a send button 328. The send button 328 may, in response to a user command, cause the client device to send the contents of the input field 323 (or "message") to the other members of the chat channel 316. The client device may transmit the message to the chat and video conference provider 210, which may in turn transmit the message to the client devices associated with the other members of the chat channel 316. Upon transmission of the message via the send button 328, the message may be published within a chat messaging panel 322. As noted above, messages exchanged within the chat channel 316 may include image files, such as JPEG, PNG, TIFF, or files in any other suitable format, may also include video files such as MPEG, GIF, or video files in any other suitable format, or may also include text entered into the input field 323 and/or other files attached to the message such as a PDF, DOC, or other file format.

As illustrated, the chat window 350 may include the chat messaging panel 322. The chat messaging panel 322 may display messages as they are exchanged between members of the chat channel 316. The messages may be displayed in the chat messaging panel 322 in real-time. The chat messaging panel 322 may include all messages that are exchanged within the chat channel 316 since the generation of the chat channel 316. As could be appreciated, by holding all messages that are exchanged between members of the chat channel 316, the chat messaging panel 322 may include a large volume of messages. Not only could a large volume of messages be generated if the chat channel 316 is active for a long duration of time or includes a large number of members, but also if the members of the chat channel 316 are increasingly communicative.

To allow members to keep track and highlight relevant or important content within the chat channel 316, members may be able to annotate messages or generate notes that are associated with messages in the chat channel 316. For example, a member may be able to highlight a message or a portion of the message, add a flag to the message, or tag someone to the message. Various embodiments of generating annotated messages are described in turn with respect to FIGS. 4, 5, and 6. Similarly, a member may be able to open a notetaking panel to generate one or more notes associated with messages within the chat channel 316. Various embodiments for generating notes are described with respect to FIGS. 7, 8, and 9.

To generate an annotated message or a note, a member of the chat channel 316 may select a notetaking button 340 within the spotlight panel 330. For example, the member may use a cursor 338 to select the notetaking button 340. In some embodiments, upon selecting the notetaking button 340 a menu 339 may be presented. The menu 339 may provide various options for annotating a message or generating a note. For example, as illustrated, the menu 339 may provide options to highlight a message, add a flag to a message, add a tag to a message, or add a note to a message. In other embodiments, instead of the notetaking button 340, annotations or notes may be generated from content exchanged within the chat messaging panel 322. For example, a member may select the content, right click, and be provided with an option to "highlight," "add flag," "add tag," or "add note."

Annotated content, which may include notes generated within the chat channel 316, may be specific to the generating member. In other words, the annotated content may only be viewable on the chat channel 316 for the generating member. In this way, each chat channel member can generate his or her own annotated content that is specific to his or her needs or desires. As such, the annotated content allows members to personalize the chat channel 316 to their own requirements. In some embodiments, as will be described in greater detail below, a member may share annotated content with another member of the chat channel 316. For example, a member may highlight a message that is important and share the highlighted message with another member. If the receiving member accepts the highlighted message, the highlighted message may be also viewable from his or her own chat channel 316. In another example, a member may generate a note associated with a message and request to share it with all the members of the chat channel 316. A host of the chat channel 316 may determine whether to accept the request or deny it. If the host accepts the request, then the note associated with the message may be published onto the chat channel 316 for all the members to view.

Figure 4:
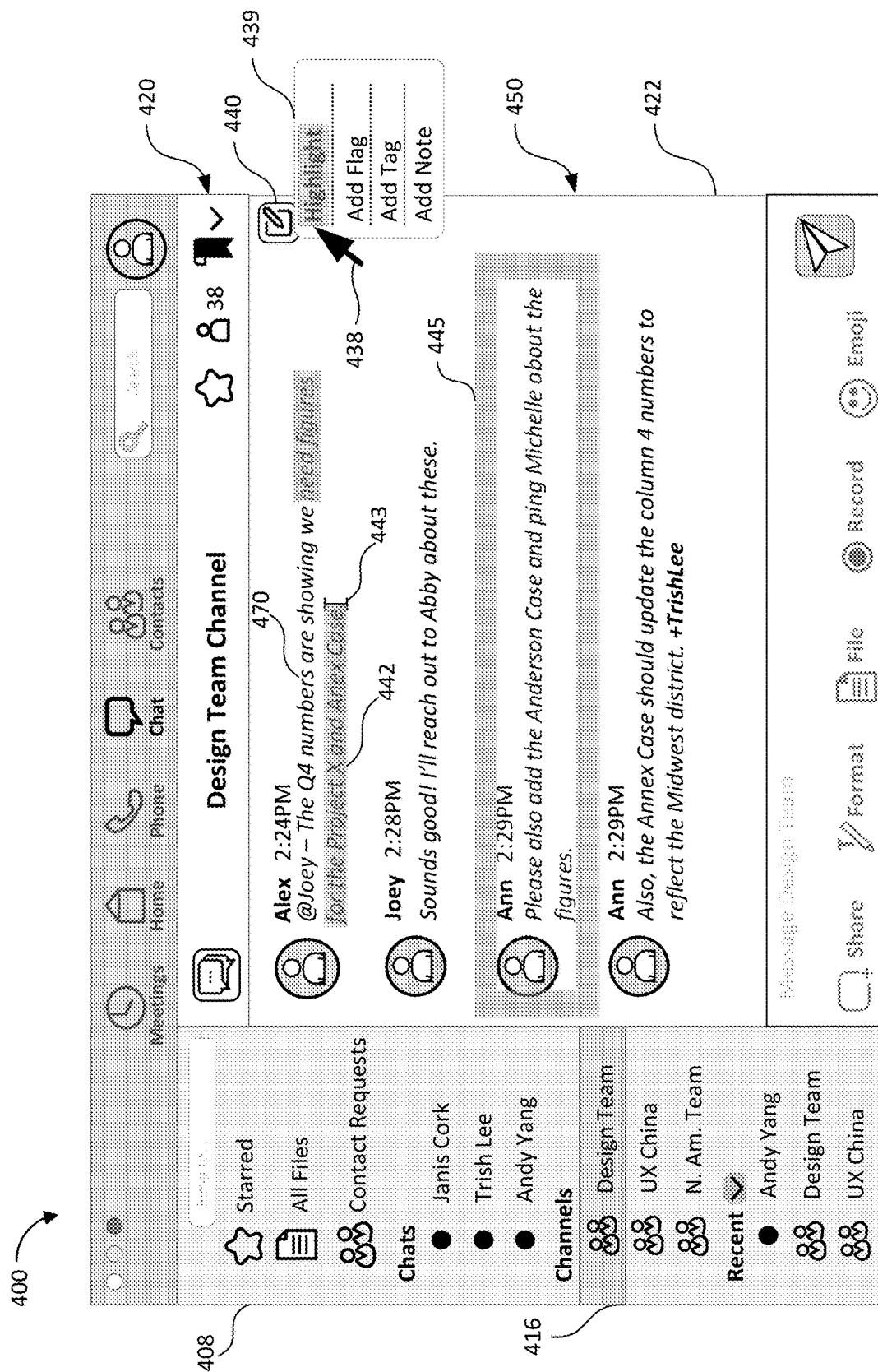
FIG. 4 illustrates a master chat panel including an example annotated message having highlighted content, according to an embodiment herein.

Referring now to FIG. 4, a master chat panel 400 including an example annotated message 470 including highlighted content 442 is illustrated, according to an embodiment herein. The master chat panel 400 may be the same or similar to the master chat panel 300. Similar numbering is used to indicate the same or similar components of FIGS. 3 and 4. For example, a dashboard 420 may be the same or similar to the dashboard 320.

As depicted, a chat channel 416 may be selected via the sidebar 408. The chat channel 416 may be accessed via a chat window 450. The chat window 450 may include a chat messaging panel 422, which may be the same or similar to the chat messaging panel 322, discussed with reference to FIG. 3. As illustrated, a member may select a notetaking button 440 using a cursor 438. Upon selection of the notetaking button 440, the member may be presented with a menu 439, from which the member selects the "highlight" option.

When the highlight option is selected, the member can select content to highlight using selector 443. The selected content may then be highlighted, as illustrated by highlighted content 442. The member can highlight content within any message that is present in the chat channel 416. For example, the member can highlight his or her own messages or messages posted by other members within the chat channel 416. In some embodiments, the highlighted content 442 may be content that is not text within a message. For example, the member may highlight the date or time associated with a message. In another example, the member may highlight the name of a member posting a message or the member may highlight non-text messages, such as pictures or images. In still a further embodiment, the member may highlight anywhere within the chat channel 416, including open areas between chat messages or create a highlight box 445 around one or more messages.

In some embodiments, an option of highlight color may be provided to the member upon selection of the highlight option from the menu 439. For example, a panel of various color options may be provided. In some embodiments, a member may be able to associate a meaning or category to a highlight color. For example, a red highlight may indicate important or urgent content, yellow highlight may indicate medium or non-urgent content, and green may indicate reference content. In cases where the member assigns meaning or category to a highlight color, the member may be able to sort or filter the highlighted content 442 by category such as to only view a specific category of highlighted content 442. For example, a member may filter such that only the red (e.g., important or urgent content) highlighted content 442 is provided within the chat messaging panel 422. Filtering by category may include only providing the highlighted content 442 that matches the category within the chat messaging panel 422. In some embodiments, this may mean only including annotated messages corresponding to the highlighted content 442 that match the category or may mean including all messages within the chat channel 416 but only including highlighted content 442 that matches the category.

Figure 5A:
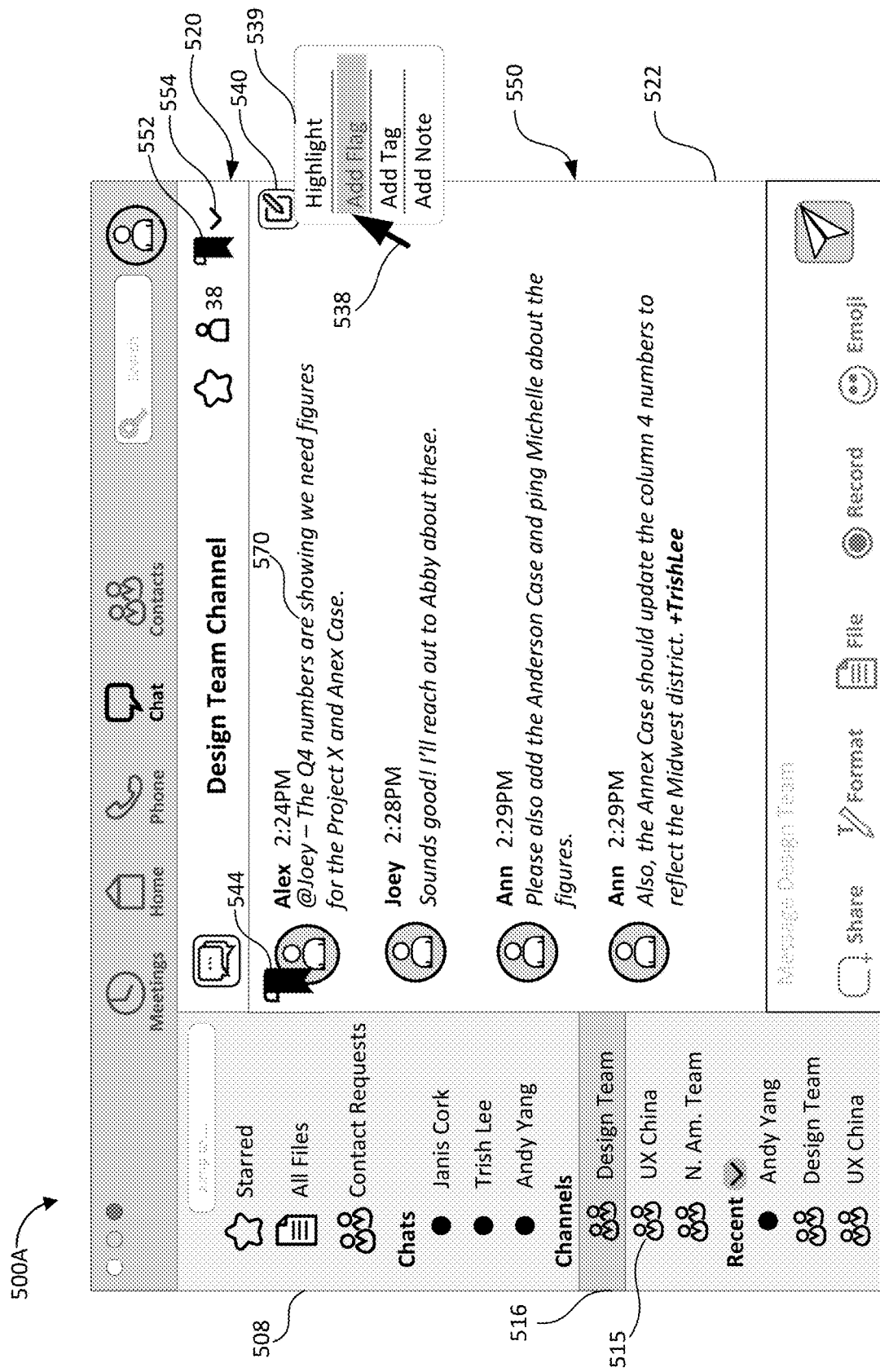
FIG. 5A illustrates a master chat panel including an example annotated message having flagged content, according to an embodiment herein.

Referring now to FIGS. 5A, a master chat panel 500A including an example annotated message having flagged content is illustrated, according to an embodiment herein. The master chat panel 500A may be the same or similar to the master chat panels 300 or 400. Similar numbering is used to indicate the same or similar components of FIGS. 3-5. For example, a dashboard 520 may be the same or similar to the dashboard 320 or 420.

As depicted, a chat channel 516 may be selected via the sidebar 508. The chat channel 516 may be accessed via a chat window 550. The chat window 550 may include a chat messaging panel 522, which may be the same or similar to the chat messaging panel 322 or 422, as discussed with reference to FIGS. 3 and 4. As illustrated, a member may select a notetaking button 540 using a cursor 538. Upon selection of the notetaking button 540, the member may be presented with a menu 539, from which the member selects the "Add Flag" option.

When the "Add Flag" option is selected, the member can select content within the chat channel 516 to flag. As illustrated, the member may select the message 570 and add a flag 544. The flag 544 may "flag" or add the message 570 to a list of flagged messages. Flagging a message may allow the member to easily and quickly return to the message at a future date. For example, if the chat channel 516 includes multiple flags 544, then the member can click through the flags that are present within the chat channel 516 without having to scroll through the chat channel 516 to find each individual message. That is, if there are four flags 544 in the chat channel 516, then the member can move between each of the four flags 544 with a single selection without needing to scroll through the messages that are present between them within the chat channel 516.

Flagging a message can also allow a member to easily identify the flagged message within the chat channel. For example, the flag 544 may be added to the message 570. In addition to or in place of the flag 544, the message 570 may change color, style, or position to indicate that it is flagged. For example, the message 570 may be highlighted, change font size, or shift to the right or the left within the chat window 550 to indicate that it contains flagged content.

To view or click through flags that are present within the chat channel 516, the dashboard 520 may include a flag button 552. In some embodiments, upon opening the chat channel 516, the chat window 540 may open to the most recent flag 544 created within the chat channel 516. In some embodiments, the flag button 552 may only be present if there is at least one flag 544 within the chat channel 516. In other embodiments, the flag button 552 may be used to add a flag 544 to content within the chat channel 522. For example, instead of using the notetaking button 540, the member may select the content within the chat channel 516 that he or she wishes to flag and select the flag button 552. Upon selection of the flag button 552 a flag 544 may be provided for the selected content.

As noted above, the flag button 552 may also allow a member to click through or view the flags 544 that are present within the chat channel 516. For example, upon selection of the flag button 552, the chat messaging panel 522 may automatically jump to the flag 544. If the member selects the flag button 552 again, then the chat messaging panel 522 may again automatically jump to the next flag 544 present within the chat channel 516. In some embodiments, a selector 554 may be present proximate to or as part of the flag button 552. Upon selection of the selector 554, the member may be presented with an option for which flags 544 to jump to. For example, upon selection of the selector 554, the member may be provided with the option to jump to first flag 544, the next flag 544, or a previous flag 544.

In some embodiments, a member may be able to jump to a flag that is not part of the chat channel 516. That is, the member may be able to jump to a flag that is in another chat channel, such as chat channel 515. For example, upon selection of the selector 554, the member may be provided with an option to view flags from other chat channels, such as the chat channel 515. From there, the member may be able to select a flag from the chat channel 515 and the chat window 550 may update to provide the chat messaging panel 522 of the chat channel 515 showing the selected flag. This can allow a member to jump between chat channels, specifically between flagged content from various chat channels with a single selection. In some embodiments, if the member selects a flag from the chat channel 515, a separate chat window 550 may be provided for the chat channel 515 such that the member can view both of chat channels 515 and 516 simultaneously. This can allow the member to continue viewing the content in the chat channel 516 while visiting the flagged content from the chat channel 515.

Figure 5B:
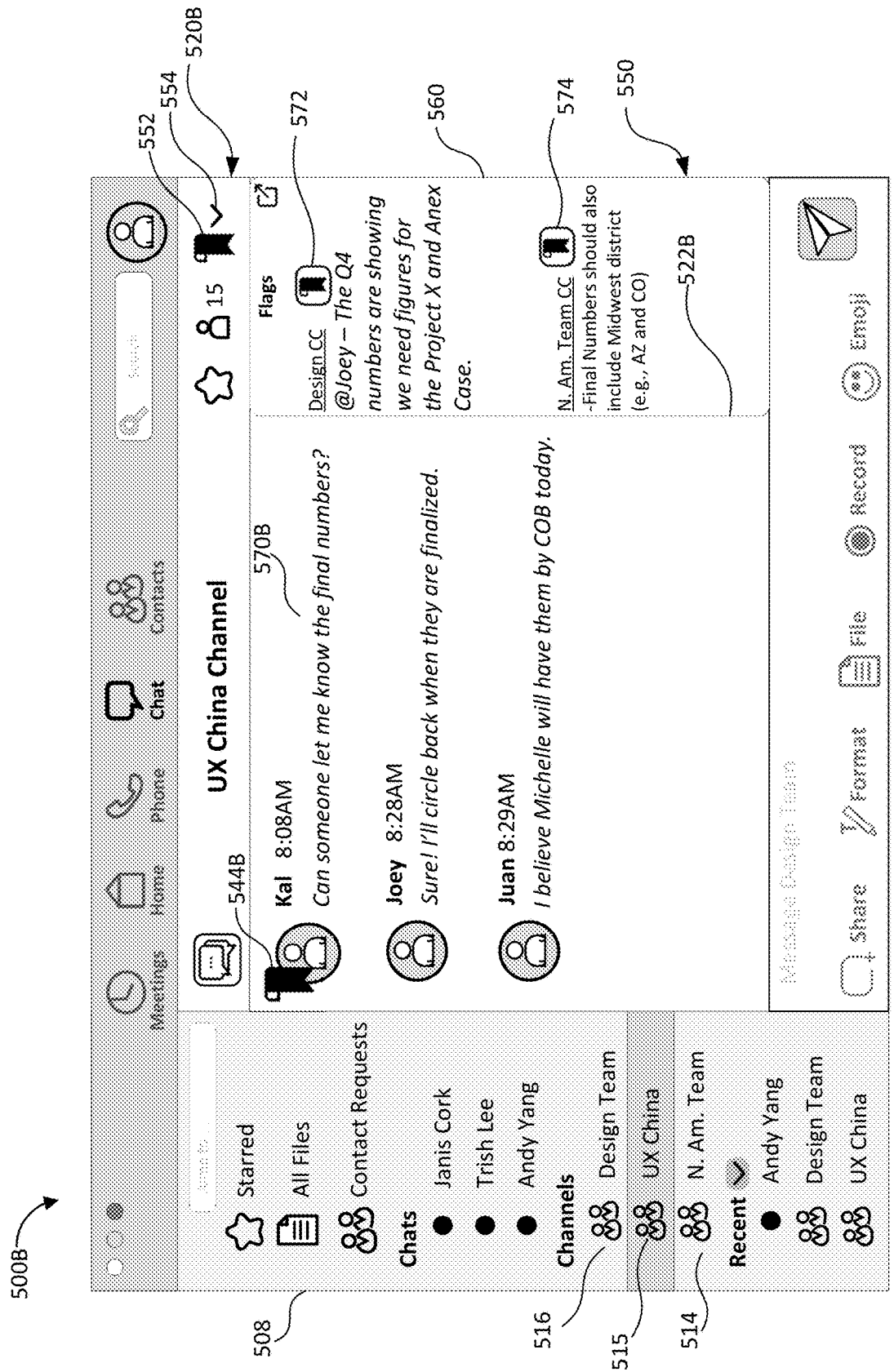
FIG. 5B illustrates a master chat panel including an example flag panel, according to an embodiment herein.

Referring now to FIG. 5B, a master chat panel 500B including an example flags panel 560 is illustrated, according to an embodiment herein. The master chat panel 500B may be the same or similar to the master chat panel 500A, except that the master chat panel 500B displays the chat channel 515. The chat channel 515 may be for the UX China chat channel 515, as identified by the dashboard 520B. The chat channel 515 may include a flag 544B on a message 570B.

As noted above, a member may desire to reference flags from other channels while in a current channel. To provide the member access and review of flags from other chat channels, the flag panel 560 may be provided. As illustrated, when a member is in the chat channel 515, the member may be able to view flags in other chat channels. The flag panel 560 may aggregate and provide flags 572 and 574 from other chat channels that a member is part of. For example, the flag 572 may be from the Design Team chat channel 516 and the flag 574 may be from the N. Am. Team chat channel 514.

In some embodiments, the flag panel 560 may only provide flags from a current channel. For example, if the member was in the Design Team channel, then only flags 572 from the Design Team channel would be viewable from the flag panel 560. In other embodiments, the flag panel 560 may provide flags from other members of a current chat channel. For example, flags generated by all members of a current channel may be provided in the flag panel 560.

The flag panel 560 may allow a member to jump between flagged messages of different chat channels with a single selection. For example, if the member selects the flag 572, the chat window 550 may update to provide a display of the chat channel 516, including the flagged message 570 (from FIG. 5A). Similarly, if the member selects the flag 574, the chat window 550 may update to provide a display of the chat channel 514, including the flagged message. As noted above, this can allow a member to easily and quickly jump to flagged content, regardless of which chat channel the flags were generated in. It should be appreciated, that although not illustrated, a similar highlight panel may be provided for highlighted content. For example, a highlight panel may aggregate and display highlighted content from across multiple chat channels. Similarly, a member can select a desired highlighted content and be able to jump to the respective chat channel and selected highlighted content from the highlight panel.

Figure 6:
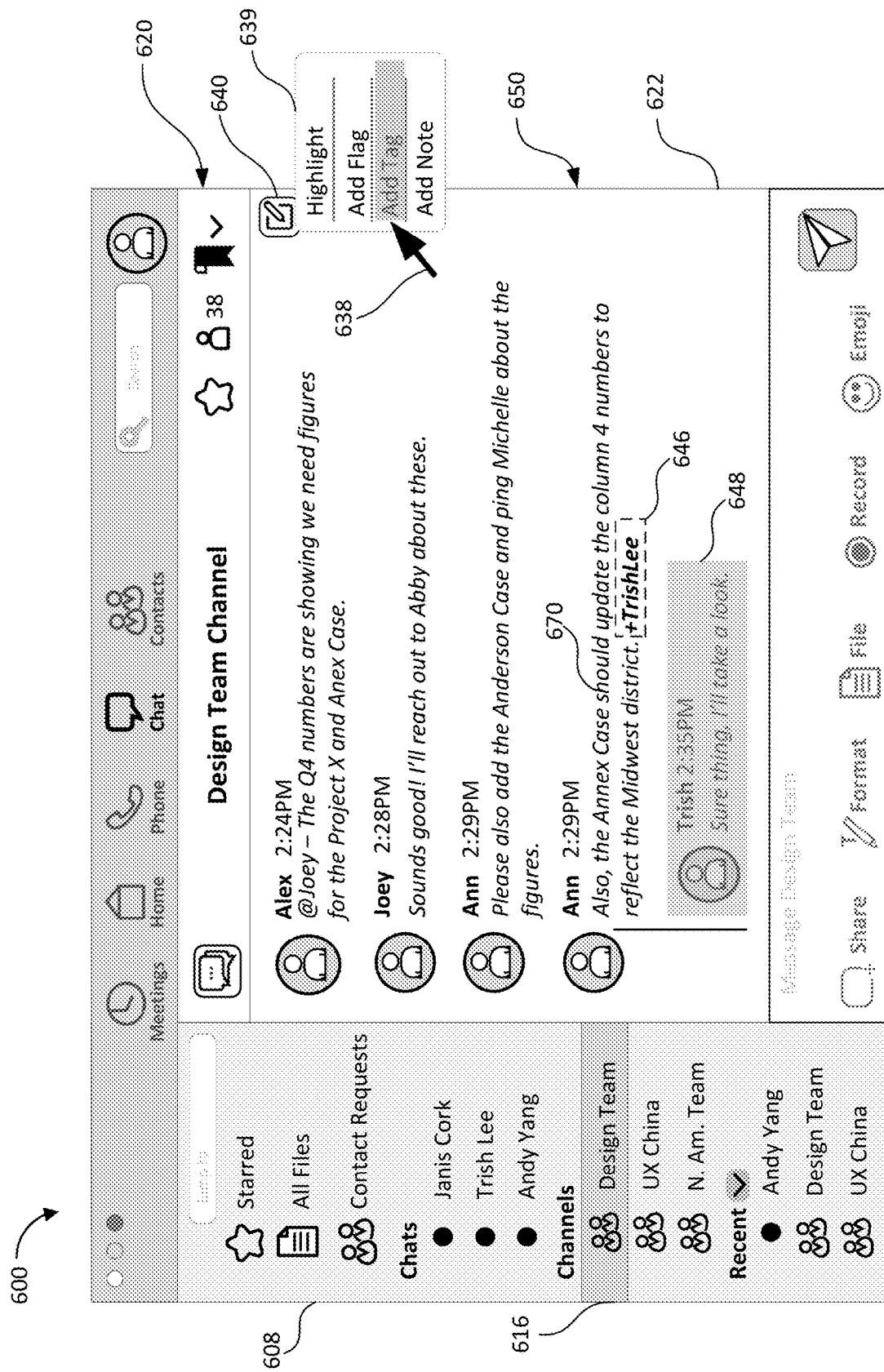
FIG. 6 illustrates a master chat panel including an example annotated message having tagged content, according to an embodiment herein.

Referring now to FIG. 6, a master chat panel 600 including an example annotated message having tagged content is illustrated, according to an embodiment herein. The master chat panel 600 may be the same or similar to the master chat panels 300, 400, or 500. Similar numbering is used to indicate the same or similar components of FIGS. 3-6. For example, a dashboard 620 may be the same or similar to the dashboard 320, 420, or 520.

As depicted, a chat channel 616 may be selected via the sidebar 608. The chat channel 616 may be accessed via a chat window 650. The chat window 650 may include a chat messaging panel 622, which may be the same or similar to the chat messaging panel 322, 422, or 522, as discussed with reference to FIGS. 3-5. As illustrated, a member may select a notetaking button 640 using a cursor 638. Upon selection of the notetaking button 640, the member may be presented with a menu 639, from which the member selects the "Add Tag" option.

When the "Add Tag" option is selected, the member can select content within the chat channel 516 to tag someone to. As illustrated, the member may select the message 670 and add a tag 646. Importantly, the message 670 may be a message posted by any member of the chat channel, not just the member adding the tag 646. In other words, any member of the chat channel 616 can add the tag 646 to any message within the chat channel 616, including messages that the tagging member did not post.

As part of the tag 646, the member may identify the person to tag to the message 670. As illustrated, the tag 646 may tag Trish Lee to the message 670. Tagging someone to a message or content within the chat channel 616 may generate a notification to the tagged person. For example, Trish Lee (e.g., the tagged person) may receive a notification that she was tagged within the chat channel 616. In some embodiments, the notification may include the message 670 or an entire thread that the message 670 is part of. From the notification, Trish Lee may be able to directly reply without entering or joining the chat channel 616. For example, as illustrated, Trish Lee may respond to the tag 646 via the notification with the response 648. The response 648 may automatically post to the chat channel 616 as part of a thread stemming from the tagged message 670.

Importantly, the tag 646 can allow Trish Lee to view and respond to the tagged message 670 without having to enter or even join the chat channel 616. In other words, someone who is not a member of the chat channel 616 can be tagged to the message 670 and be able to view and respond to the message 670. This can be helpful when input from an individual who is not part of the chat channel 616 ("non-chat channel individual") is required. Conventionally, the non-chat channel individual may be required to join the chat channel 616 to view and respond to the content within the chat channel 616, such as the message 670. This can cause the non-chat channel individual to end up being part of multiple chat channels that are irrelevant to that person except for this brief circumstance. The tag 646 can allow non-chat channel individuals to view and respond to content in discrete intervals, as required or needed by chat channel members. The tag 646 may only be viewable within the chat channel 616 by the member generating the tag 646 and the tagged individual (e.g., Trish Lee).

Figure 7:
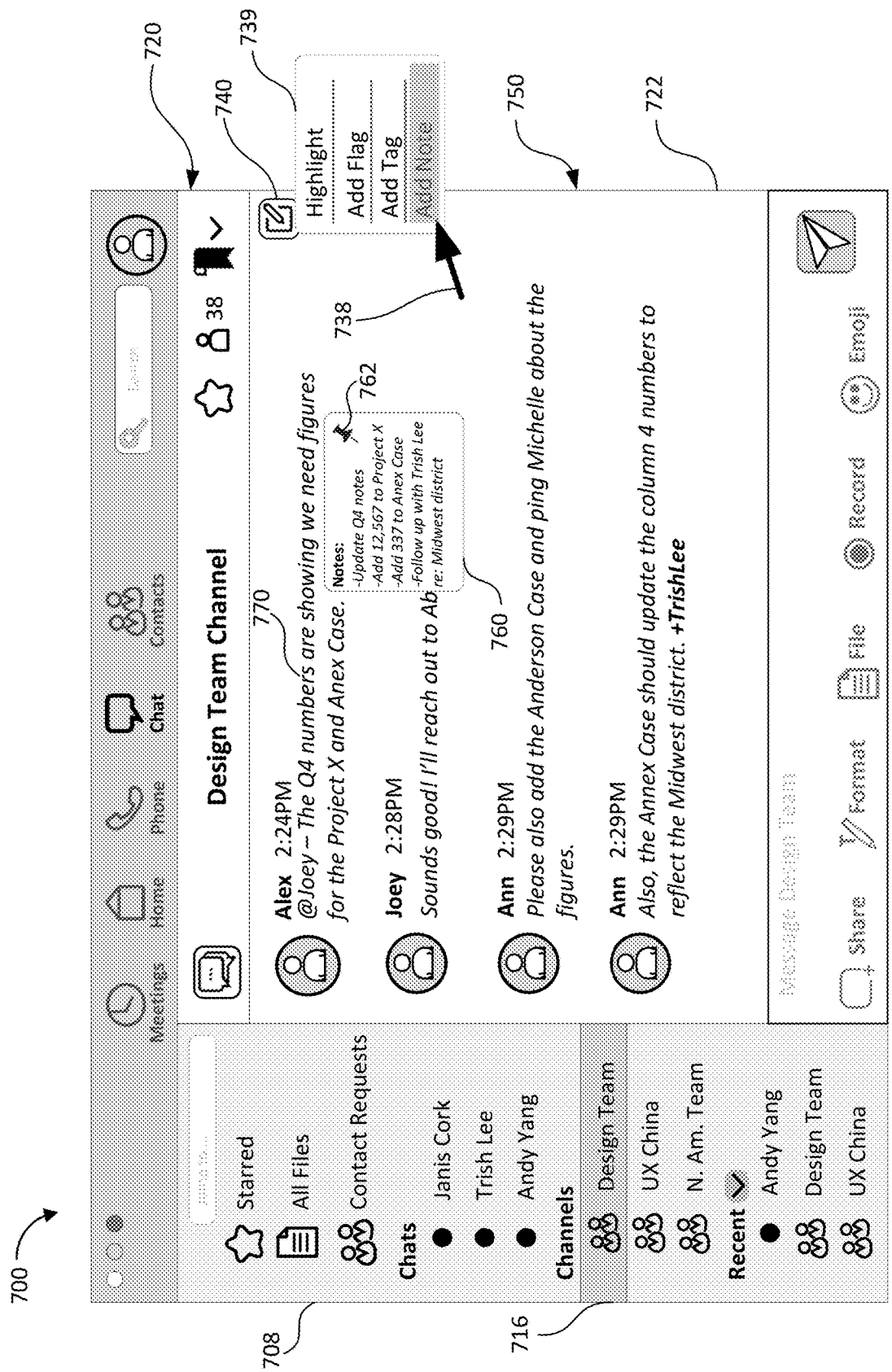
FIG. 7 illustrates a master chat panel including an example note corresponding to a message, according to an embodiment herein.

Referring now to FIG. 7, a master chat panel 700 including an example annotated message including a note is illustrated, according to an embodiment herein. The master chat panel 700 may be the same or similar to the master chat panels 300-600. Similar numbering is used to indicate the same or similar components of FIGS. 3-7. For example, a dashboard 720 may be the same or similar to the dashboard 320, 420, 520, or 620.

As depicted, a chat channel 716 may be selected via the sidebar 708. The chat channel 716 may be accessed via a chat window 750. The chat window 750 may include a chat messaging panel 722, which may be the same or similar to the chat messaging panel 322, 422, 522, or 622, as discussed with reference to FIGS. 3-6. As illustrated, a member may select a notetaking button 740 using a cursor 738. Upon selection of the notetaking button 740, the member may be presented with a menu 739, from which the member selects the "Add Note" option.

When the "Add Note" option is selected, the member can select content, such as message 770, within the chat channel 716 to which to add a note 760. The note 760 may be a panel or pop-up window that allows the member to generate notes within the note 760. Because the message 770 was selected for generating the note 760, the note 760 may be associated with the message 770. As will be described in greater detail with respect to FIGS. 8 and 9, the note 760 may be linked to the message 770.

As illustrated, the note 760 may be generated as a pop-up window within the chat messaging panel 722. This way, the member can view the message 770 while he or she generates the note 760. In some embodiments, the note 760 may be moveable such that the member can move the note 760 around the chat channel 716 as required. This can allow the member to view other content within chat channel 716 while generating the note 760. If the member wishes to pin or attach the note 760 to the message 770 within the chat channel 716, the member can select the pin 762. Upon selection of the pin 762, the note 760 may be pinned to the message 770 meaning that if the member scrolled further down in the chat messaging panel 722 the note 760 would remain as pinned with the message 770. This can allow the member to organize or "store" the note 760 as desired. For example, by pinning the note 760 to the message 770, the note 760 may remain with the message 770 so when the member revisits the message 770 at a later date the note 760 is viewable.

In some embodiments, instead of generating the note 760 as a pop-up window or pinning the note 760 to the message 770, a notetaking panel may be provided. The notetaking panel may allow the member to take and view multiple notes in a single place while scrolling through the chat channel 716.

Figure 8:
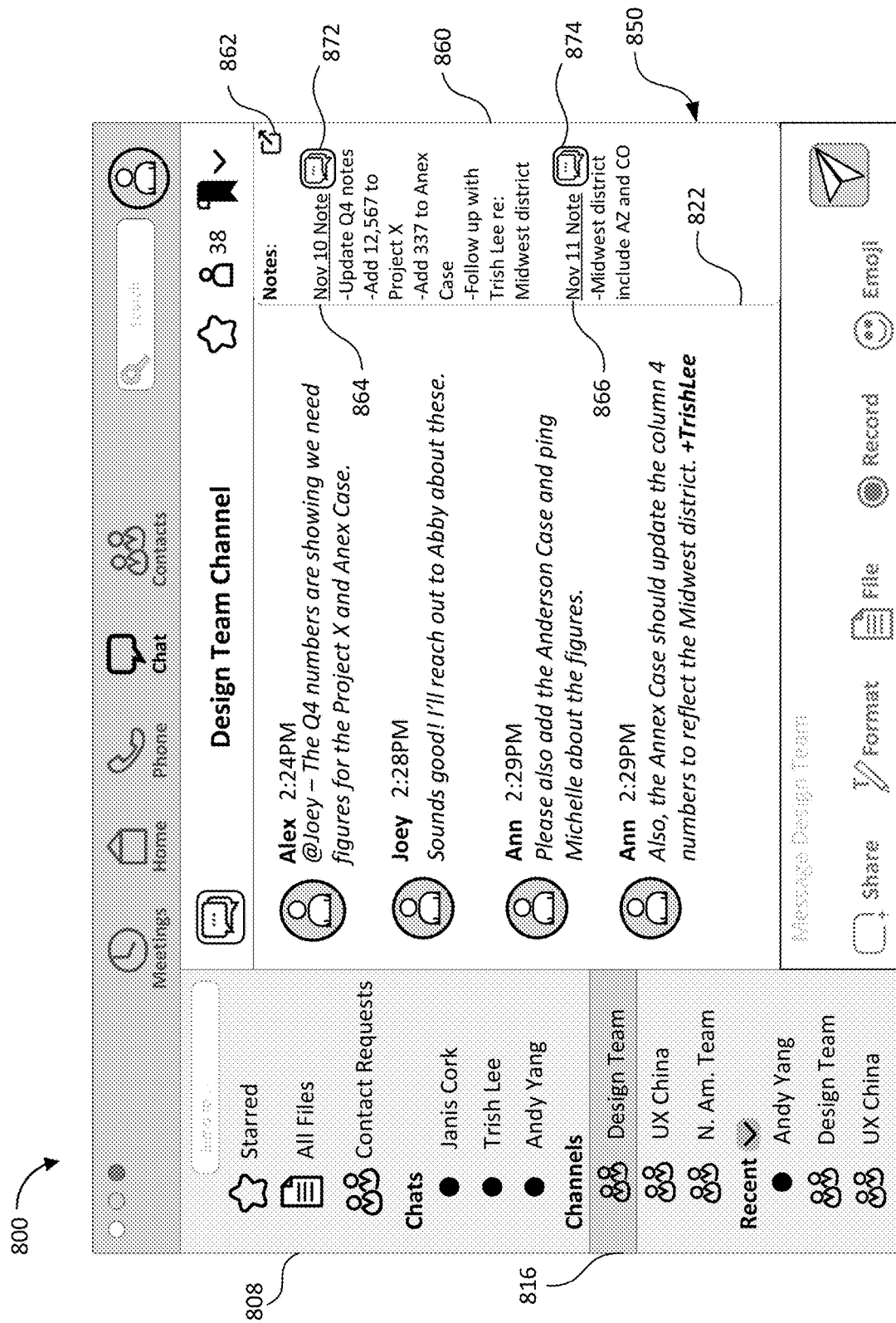
FIG. 8 illustrates a master chat panel having an example notetaking panel, according to an embodiment herein.

Referring now to FIG. 8, a master chat panel 800 including an example notetaking panel is illustrated, according to an embodiment herein. The master chat panel 800 may be the same or similar to the master chat panels 300-700. Similar numbering is used to indicate the same or similar components of FIGS. 3-7. For example, a dashboard 820 may be the same or similar to the dashboard 320, 420, 520, 620, or 720.

As depicted, a chat channel 816 may be selected via the sidebar 808. The chat channel 816 may be accessed via a chat window 850. The chat window 850 may include a chat messaging panel 822, which may be the same or similar to the chat messaging panel 322, 422, 522, 622, or 722, as discussed with reference to FIGS. 3-7. As illustrated, instead of generating a note, such as the note 760, within the chat messaging panel 822, a notetaking panel 860 may be provided. The notetaking panel 860 may be a separate panel from the chat messaging panel 822. It should be appreciated that while the notetaking panel 860 is illustrated as positioned to the right of the chat messaging panel 822, the notetaking panel 860 may be positioned and configured in other arrangements. For example, the member may rearrange the notetaking panel 860 such that it's positioned below the chat messaging panel 822. In some embodiments, the notetaking panel 860 may include a pop-up button 862 that can allow the member to freely move the notetaking panel 860 around the chat window 850 as desired.

The notetaking panel 860 can allow the member to take and review notes for content across the chat channel 816. For example, as illustrated, the notetaking panel 860 may include two notes. A first note 864 may be for a first message posted on November 10$^{th}$ and a second note 866 may be for a second message posted on November 11$^{th}$. As each note was generated for a respective message, a message selection 872 may be provided for the first message associated with the note 864 and a message selection 874 may be provided for the second message associated with the note 866. Each of the message selections 872 and 874 may allow a member to view the associated first message and second message, respectively. For example, if the member selects the message selection 872, the member may be provided with a pop-up of the first message. In another example, upon selection of the message selection 872, the chat messaging panel 822 may jump to the first message. This can allow the member to view the associated message or content when generating or reviewing the notes 864 and 866 on the notetaking panel 860.

In some embodiments, one or more of the notetaking or annotation features may be combined. For example, a member may tag someone to a note. In such an example, the tagged person may be able to view the note and the associated message and respond accordingly. In another example, the member may highlight content within the notetaking panel 860.

In some embodiments, a chat channel member may be a multi-channel member involved in multiple chat channels. As such, the multi-channel member may be exposed to a high volume of messages and content from the various chat channels. Even if the multi-channel member generates annotated content within individual chat channels, the multi-channel member may have difficulties reviewing and accessing the annotated content. For example, the multi-channel member may generate a note in a first chat channel but be unable to remember, at a later date, which chat channel that note was generated within.

Figure 9:
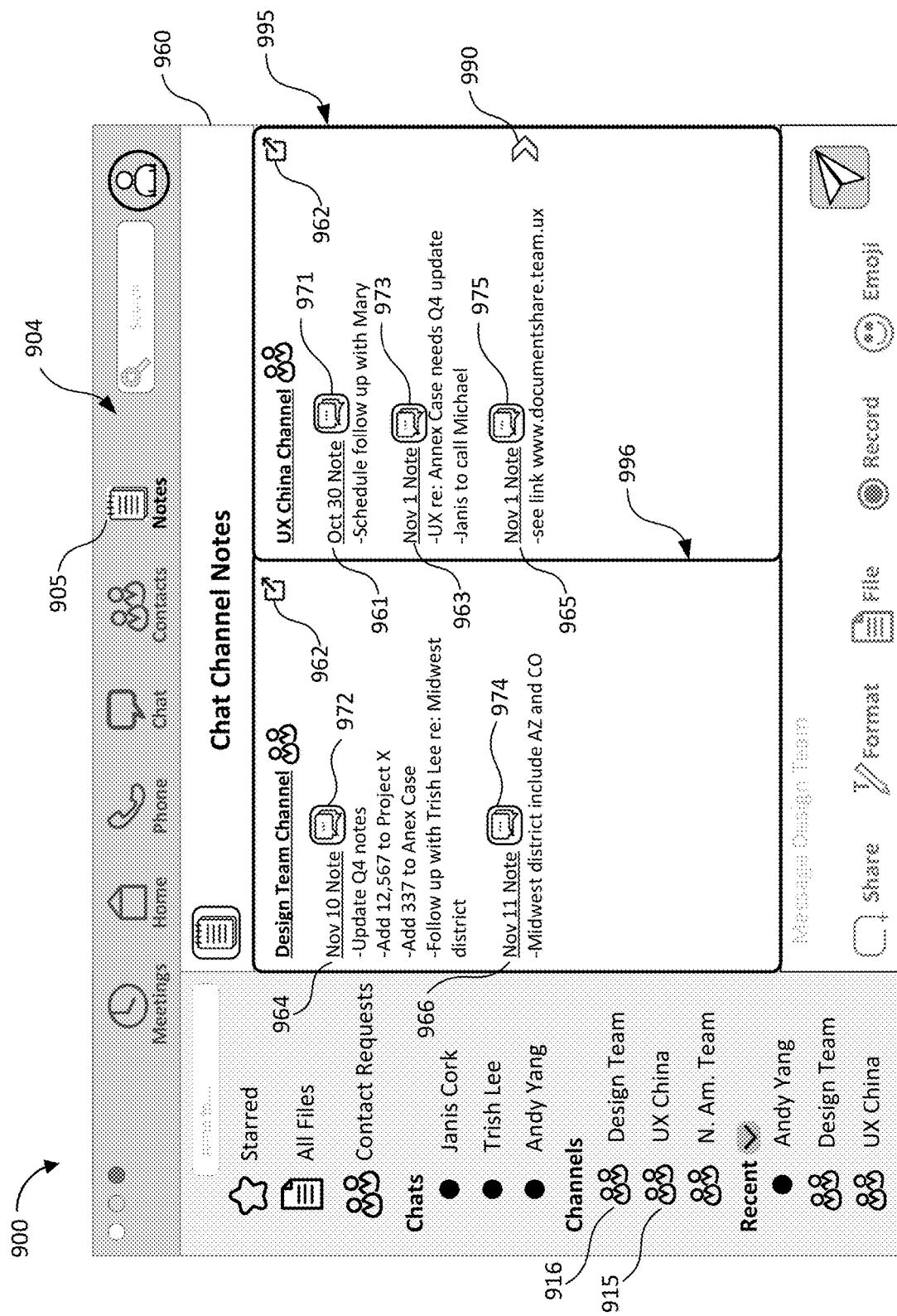
FIG. 9 illustrates an example master notetaking panel, according to an embodiment herein.

To provide multi-channel members easy access and review of annotated messages and notes (e.g., annotated content) generated across multiple chat channels, a master notetaking panel may be provided. Referring now to FIG. 9, a master chat panel 900 including an example notetaking panel 960 is provided, according to an embodiment herein. The notetaking panel 960 may aggregate notes, and in some cases annotated messages, from different chat channels that a given user is a member in a simple display for quick and easy review by the multi-channel member. For example, per the illustrated example, a multi-channel member may be part of a chat channel 915 and a chat channel 916. The notetaking panel 960 can allow the multi-channel member to customize how he or she views respective notetaking content from each of the chat channels 915 and 916, and in some cases, share the notetaking panel 960 or the content therein with other members. A member may access the notetaking panel 960 via a notes button 905 on the dashboard 904.

As illustrated, the notetaking panel 960 may include notetaking section 996 corresponding to the chat channel 916 and a notetaking section 995 corresponding to the chat channel 915. There may be additional notetaking sections for other chat channels. To view these notetaking sections, a next button 990 may be provided. Upon selection of the next button 990, the next notetaking section may be provided on the notetaking panel 960.

Each notetaking section may provide notes from a respective chat channel. For example, the notetaking section 996 may include notes 964 and 966 that correspond to messages within the chat channel 916. The notetaking section 996 may correspond to a notetaking panel that is part of the chat channel 916, such as the notetaking panel 860, or may correspond to individual notes, such as the note 760. In other words, the notetaking section 996 may aggregate notes generated within the chat channel 916. Similarly, the notetaking section 995 may include notes 961, 963, and 965 that correspond to messages or content from the chat channel 915. Each of the notes 961-966 may be associated with a message or content from the respective chat channels. To allow the member to view the associated content, a message selection may be provided for each note. For example, the message selection 972 may be provided for the note 964, the message selection 974 may be provided for the note 966, the message selection 971 may be provided for the note 961, the message selection 973 may be provided for the note 963, and the message selection 975 may be provided for the note 965. Upon selection of a given message selection, the associated message may be provided to the member, such as for example via a pop-up window.

In some embodiments, the member may wish to take a notetaking section with as he or she navigates to a chat channel. For example, the member can select the pop-out button 962 for the notetaking section 996 and the notetaking section 996 may be provided as a pop-put window. The member may then navigate to a chat channel, such as the chat channel 916 and the notetaking section 996 as a pop-out window may persist. This can allow the member to view the notes on a given notetaking section while navigating to different content within the master chat panel 900.

Figure 10:
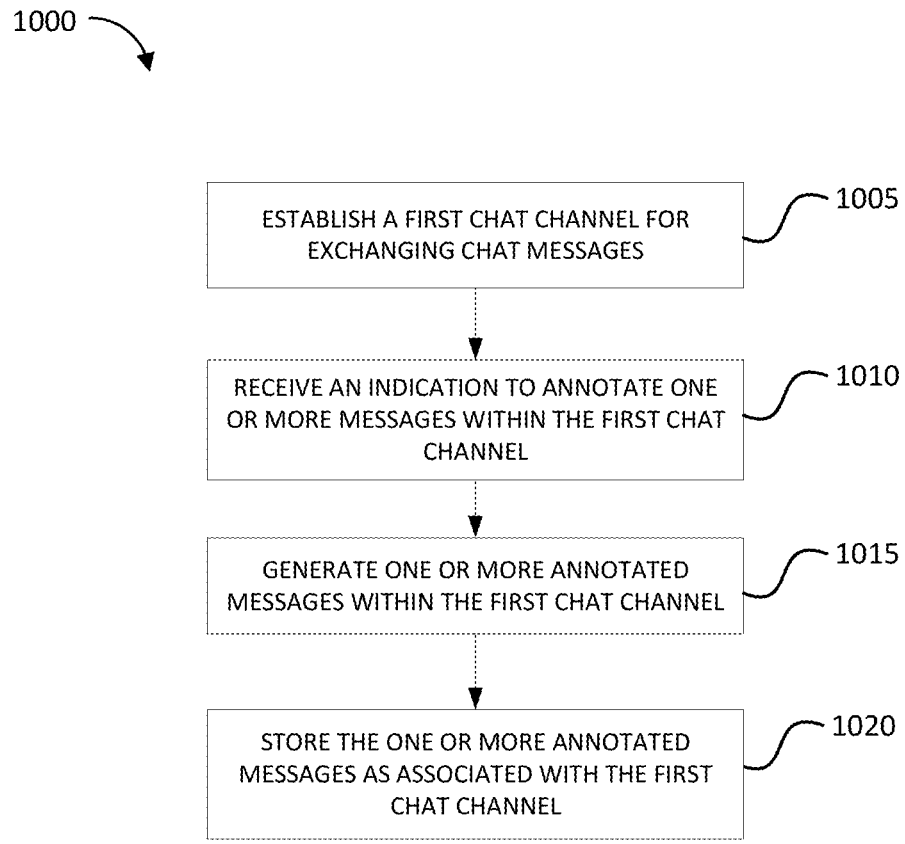
FIG. 10 illustrates an exemplary method for generating annotated message(s) within a chat channel, according to an embodiment herein.

Referring now to FIG. 10, a flowchart of an example method 1000 for generating annotated message(s) within a chat channel is provided. The description of the method 1000 in FIG. 10 will be made with reference to FIGS. 3-9, however any suitable system according to this disclosure may be used, such as the example systems 100 and 200, shown in FIGS. 1 and 2.

The method 1000 may include steps 1005 and 1010. At step 1005, a first chat channel may be established. For example, the video conference provider 210 may establish the chat channel 316. A plurality of client devices may be able to exchange one or more chat messages between each other within the chat channel. At step 1010, an indication to annotate one or more messages within the first chat channel may be received. For example, the video conference provider 210 may receive an indication to annotate one or more messages within the chat channel 316. For example, the indication to annotate the one or more messages may include an indication to highlight content within the chat channel, an indication to flag content within the chat channel, an indication to tag content within the chat channel, and/or an indication to add a note corresponding to content within the chat channel.

The method 1000 may also include steps 1015 and 1020. At step 1015, one or more annotated messages may be generated within the first chat channel based on the indication. For example, the video conference provider 210 may generate one or more annotated messages within the chat channel 316 based on the indication. In an example embodiment, step 1015 may include identifying a first message of the one or more messages within the first chat channel corresponding to the indication, generating a first annotated message including an indication of highlighting of content within the first annotated message, and associating the first annotated message within the first message of the one or more messages within the first chat channel. In another example embodiment, the step 1015 may include identifying, by the video conference provider, a first message of the one or more messages within the first chat channel corresponding to the indication and generating, by the video conference provider, a first flag for the first message within the first chat channel to provide quick access to the first message within the first chat channel. In such embodiments, the method 1000 may also include receiving, from a first client device, a selection of the first flag, transmitting, to the first client device, the first message corresponding to the first flag for display on the first chat channel, receiving, from the first client device, a selection of a second flag associated with a second message of the one or more annotated messages, and transmitting, to the first client device, the second message corresponding to the second flag for display on the first chat channel.

In still another example embodiment, the step 1015 may include identifying, by the video conference provider, a first message of the one or more messages within the first chat channel corresponding to the indication and generating, by the video conference provider, a tag associated with the first message for display within the first chat channel. The tag may identify a second client device to be associated with the first message and the second client device may not associated with the first chat channel. In such cases, the method 1000 may include transmitting, by the video conference provider, a notification of the tag for the first message to the second client device. In an Example, the method 1000 may also include receiving, by the video conference provider from the second client device, content associated with the tag and transmitting, by the video conference provider to the one or more client devices, the content associated with the tag for display within the first chat channel proximate to the first message.

At step 1020, the method 1000 may include storing, by the video conference provider, the one or more annotated messages as associated with the first chat channel. In some embodiments, after the one or more annotated messages are stored by the video conference provider, the video conference provider may receive a request for the one or more annotated messages. The video conference provider may identify the one or more annotated messages stored by the video conference provider associated with the first chat channel and transmit the one or more annotated messages for display within the first chat channel to the first client device. In an Example, the method 1000 may include receiving, from a first client device, a request to review the one or more annotated messages and transmitting, by the video conference provider to the first client device, a summary review of the one or more annotated messages for display on the first client device.

The method 1000 may also include receiving, by the video conference provider, a request to share the one or more annotated messages generated for the first client device with a second client device and transmitting, by the video conference provider, the one or more annotated messages for display on the second client device. Optionally, the second client device may not be connected or associated with the first chat channel. In an embodiment, the method 1000 may include receiving, by the video conference provider, a request to publish the one or more annotated messages within the first chat channel with the first plurality of client devices associated with the first chat channel and transmitting, by the video conference provider to the first plurality of client devices connected to the first chat channel, the one or more annotated messages for display within the first chat channel.

In an embodiment, the method 1000 may include receiving, by the video conference provider, a request to share the one or more annotated messages within the first chat channel with a second chat channel for exchanging chat messages between a second plurality of client devices and transmitting, by the video conference provider to the second plurality of client devices, the one or more annotated messages for display on the second chat channel. In another embodiment, the method 1000 may include exporting, by the video conference provider, the one or more annotated messages from the first chat channel to an export file and transmitting, by the video conference provider, the export file including the one or more annotated messages from the first chat channel to a first client device.

Figure 11:
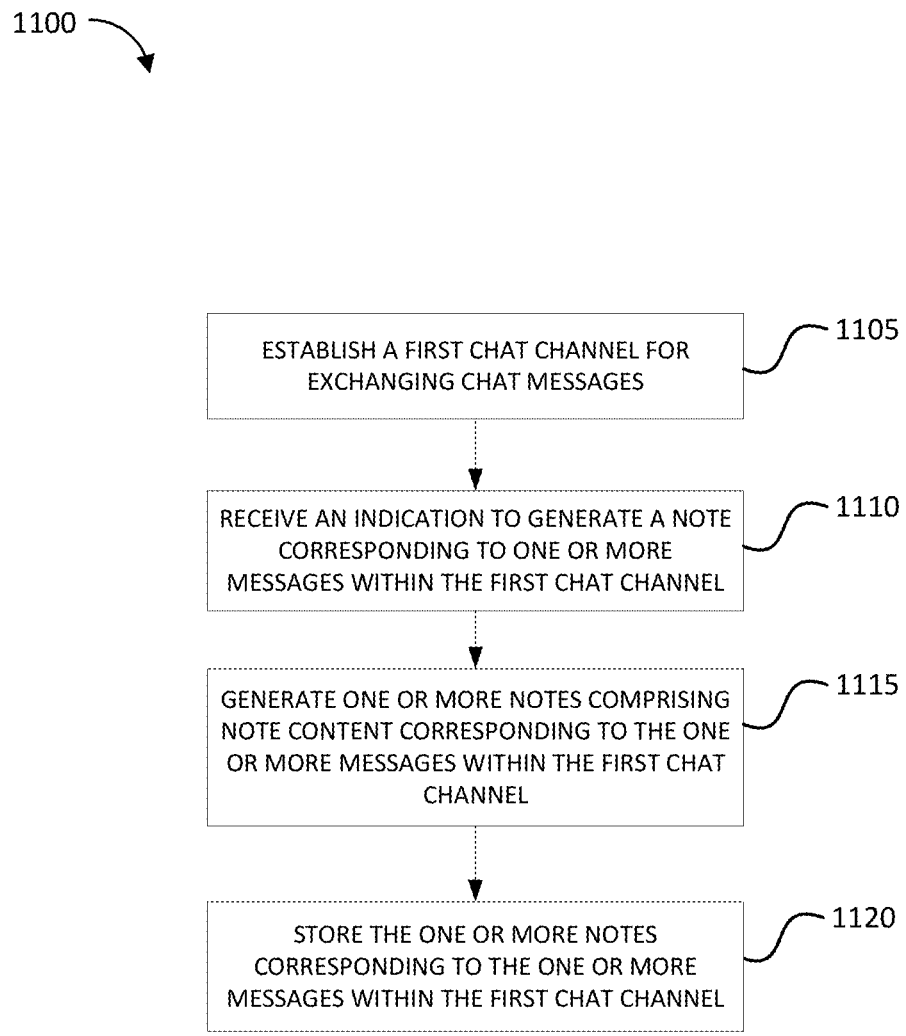
FIG. 11 illustrates an exemplary method for notetaking within a chat channel, according to an embodiment herein.

Referring now to FIG. 11, a flowchart of an example method 1100 for notetaking within a chat channel is provided. The description of the method 1100 in FIG. 11 will be made with reference to FIGS. 3-9, however any suitable system according to this disclosure may be used, such as the example systems 100 and 200, shown in FIGS. 1 and 2.

The method 1100 may include steps 1105 and 1110. At step 1105, a first chat channel may be established. For example, the video conference provider 210 may establish the chat channel 316. A plurality of client devices may be able to exchange one or more chat messages between each other within the chat channel. At step 1110, an indication to generate a note corresponding to one or more messages within the first chat channel may be received. For example, the video conference provider 210 may receive an indication to generate a note corresponding to one or more messages within the chat channel 316. The indication may be received from a first client device of a plurality of client devices associated with the chat channel 316. The indication may include note content.

The method 1100 may include steps 1115 and 1120. At step 1115, the method 1100 may include generating, by the video conference provider, one or more notes including the note content corresponding to the one or more messages within the first chat channel based on the indication. In an example embodiment, step 1115 may include generating, by the video conference provider, a first note including first note content corresponding to a first message of the one or more messages within the first chat channel and generating, by the video conference provider, a second note including second note content corresponding to a second message of the one or more messages within the first chat channel. In such cases, the method 1100 may include identifying the first note stored by the video conference provider corresponding to the first message, transmitting, by the video conference provider to the first client device, the first note for display proximate to the first message within the first chat channel, identifying the second note stored by the video conference provider corresponding to the second message, and transmitting, by the video conference provider to the first client device, the second note for display proximate to the second message within the first chat channel.

At step 1120, the method 1100 may include storing, by the video conference provider, the one or more notes corresponding to the one or more messages within the first chat channel. In some embodiments, the method 1100 may further include identifying the one or more notes stored by the video conference provider corresponding to the first chat channel and transmitting, by the video conference provider, the one or more notes corresponding to the one or more messages within the first chat channel for display on a notetaking panel within the first chat channel. For example, the method 1100 may include receiving, from the first client device, an indication that the first client device has left the first chat channel, receiving, from the first client device, a request for the one or more notes within the notetaking panel, and transmitting, by the video conference provider, the one or more notes to the first client device for display within the notetaking panel.

In some embodiments, the method 1100 may include identifying the one or more notes stored by the video conference provider corresponding to the first chat channel and transmitting, by the video conference provider, the one or more notes corresponding to the one or more messages within the first chat channel for display on a notetaking panel within the first chat channel. Optionally, the method 1100 may include establishing, by the video conference provider, a second chat channel for exchanging chat messages between a second plurality of client devices, wherein the second plurality of client devices includes the first client device, receiving, by the video conference provider, an indication from the first client device to generate a note corresponding to one or more messages within the second chat channel, generating, by the video conference provider, a second note including second note content corresponding to the one or more messages within the second chat channel based on the indication, and storing, by the video conference provider to the first client device, the second note including the second note content corresponding to the one or more messages in the second chat channel. The method 1100 may also include identifying the second note stored by the video conference provider corresponding to the second chat channel and transmitting, by the video conference provider, the second corresponding to the one or more messages within the second chat channel for display on the notetaking panel. Optionally, the method 1100 may include receiving, by the video conference provider from the first client device, a selection of the second note within the notetaking panel and transmitting, by the video conference provider, an indication to display the second message within the second chat channel to the first client device.

In some embodiments, the method 1100 may include exporting, by the video conference provider, the one or more notes from the notetaking panel to an export file and providing, by the video conference provider, the export file to the first client device. In another embodiment, the method 1100 may include receiving, by the video conference provider, a request to share one or more notes generated for the first client device with a second client device and transmitting, by the video conference provider, the one or more notes and the corresponding messages from the first chat channel for display on the second client device. Optionally, the second client device is not connected to the first chat channel.

In embodiments, the method 1100 may include receiving, by the video conference provider, a request to publish the one or more notes within the first chat channel for the plurality of client devices associated with the first chat channel and transmitting, by the video conference provider to the plurality of client devices connected to the first chat channel, the one or more notes for display within the first chat channel.

Figure 12:
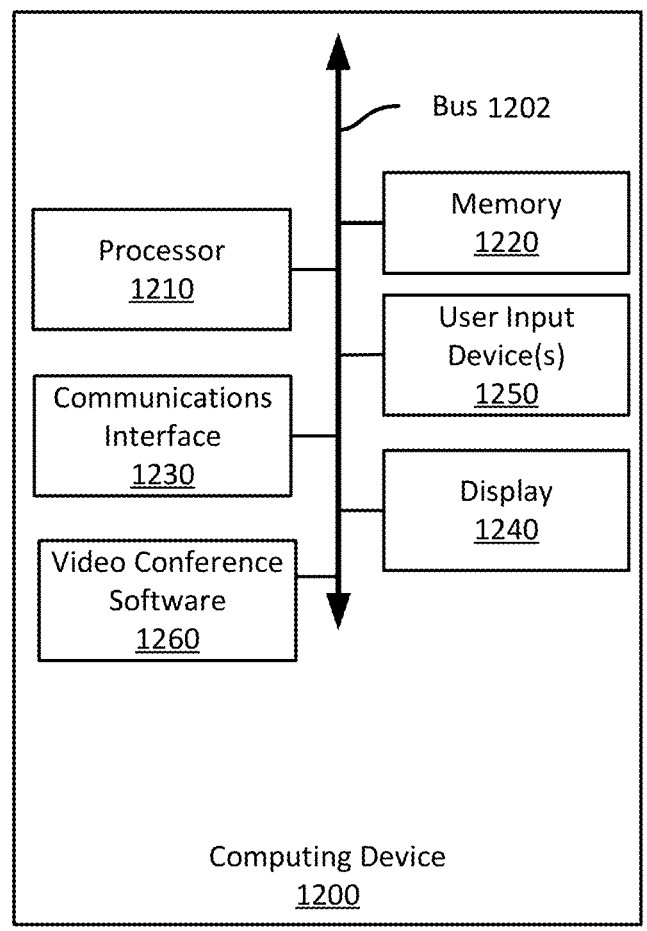
FIG. 12 shows an example computing device suitable for notetaking and generating annotated message(s) within a chat channel, according to this disclosure.

Referring now to FIG. 12, FIG. 12 shows an example computing device 1200 suitable for use in example systems or methods notetaking and generating annotated message(s) within a chat channel. The example computing device 1200 includes a processor 1210 which is in communication with the memory 1220 and other components of the computing device 1200 using one or more communications buses 1202. The processor 1210 is configured to execute processor-executable instructions stored in the memory 1220 to perform one or more methods for notetaking and generating annotated message(s) within a chat channel, such as part or all of the example method 1000, described above with respect to FIG. 10, or example method 1100, described above with respect to FIG. 11. For example, the video conferencing software 1260 provided on the computing device 1200 may provide instructions for performing one or more steps of the methods 1000 or 1100 for notetaking and generating annotated message(s) within a chat channel. The computing device, in this example, also includes one or more user input devices 1250, such as a keyboard, mouse, touchscreen, video input device (e.g., one or more cameras), microphone, etc., to accept user input. The computing device 1200 also includes a display 1240 to provide visual output to a user.

The computing device 1200 also includes a communications interface 1230. In some examples, the communications interface 1230 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, which may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

EXAMPLES

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification As used below, any reference to a series of examples is to be understood as a reference to each of those examples disjunctively (e.g., "Examples 1-4" is to be understood as "Examples 1, 2, 3, or 4").

Example 1 is a method comprising: establishing, by a video conference provider, a first chat channel for exchanging chat messages between a plurality of client devices; receiving, by the video conference provider, an indication to annotate one or more messages within the first chat channel; generating, by the video conference provider, one or more annotated messages within the first chat channel based on the indication; and storing, by the video conference provider, the one or more annotated messages as associated with the first chat channel.

Example 2 is the method of any previous or subsequent Example, wherein generating, by the video conference provider, the one or more annotated messages within the first chat channel based on the indication further comprises: identifying, by the video conference provider, a first message of the one or more messages within the first chat channel corresponding to the indication; generating, by the video conference provider, a first annotated message comprising an indication of highlighting of content within the first annotated message; and associating, by the video conference provider, the first annotated message with the first message of the one or more messages within the first chat channel.

Example 3 is the method of any previous or subsequent Example, wherein generating, by the video conference provider, the one or more annotated messages within the first chat channel based on the indication further comprises: identifying, by the video conference provider, a first message of the one or more messages within the first chat channel corresponding to the indication; and generating, by the video conference provider, a first flag for the first message within the first chat channel to provide quick access to the first message within the first chat channel.

Example 4 is the method of any previous or subsequent Example, the method further comprising: receiving, from a first client device, a selection of the first flag; transmitting, to the first client device, the first message corresponding to the first flag for display on the first chat channel; receiving, from the first client device, a selection of a second flag associated with a second message of the one or more annotated messages; and transmitting, to the first client device, the second message corresponding to the second flag for display on the first chat channel.

Example 5 is the method of any previous or subsequent Example, wherein generating, by the video conference provider, the one or more annotated messages within the first chat channel based on the indication further comprises: identifying, by the video conference provider, a first message of the one or more messages within the first chat channel corresponding to the indication; and generating, by the video conference provider, a tag associated with the first message for display within the first chat channel, wherein: the tag identifies a second client device to be associated with the first message; and the second client device is not associated with the first chat channel.

Example 6 is the method of any previous or subsequent Example, the method further comprising: transmitting, by the video conference provider, a notification of the tag for the first message to the second client device.

Example 7 is the method of any previous or subsequent Example, the method further comprising: receiving, by the video conference provider from the second client device, content associated with the tag; and transmitting, by the video conference provider to the one or more client devices, the content associated with the tag for display within the first chat channel proximate to the first message.

Example 8 is a system comprising: a non-transitory computer-readable medium; a communications interface; and a processor communicatively coupled to the non-transitory computer-readable medium and the communications interface, the processor configured to execute processor-executable instructions stored in the non-transitory computer-readable medium to: establish, by a video conference provider, a first chat channel for exchanging chat messages between a first plurality of client devices; receive, by the video conference provider, an indication to annotate one or more messages within the first chat channel; generate, by the video conference provider, one or more annotated messages within the first chat channel based on the indication; and store, by the video conference provider, the one or more annotated messages as associated with the first chat channel.

Example 9 is the system of any previous or subsequent Example, wherein the indication is received from a first client device of the first plurality of client devices, and wherein the processor is further configured to execute processor-executable instructions stored in the non-transitory computer-readable medium to: identify the one or more annotated messages stored by the video conference provider associated with the first chat channel; and transmit, by the video conference provider, the one or more annotated messages for display within the first chat channel to the first client device.

Example 10 is the system of any previous or subsequent Example, wherein the processor is further configured to execute processor-executable instructions stored in the non-transitory computer-readable medium to: receive, by the video conference provider, a request to share the one or more annotated messages generated for the first client device with a second client device; and transmit, by the video conference provider, the one or more annotated messages for display on the second client device.

Example 11 is the system of any previous or subsequent Example, wherein the second client device is not connected to the first chat channel.

Example 12 is the system of any previous or subsequent Example, wherein the processor is further configured to execute processor-executable instructions stored in the non-transitory computer-readable medium to: receive, by the video conference provider, a request to publish the one or more annotated messages within the first chat channel with the first plurality of client devices associated with the first chat channel; and transmit, by the video conference provider to the first plurality of client devices connected to the first chat channel, the one or more annotated messages for display within the first chat channel.

Example 13 is the system of any previous or subsequent Example, wherein the processor is further configured to execute processor-executable instructions stored in the non-transitory computer-readable medium to: receive, by the video conference provider, a request to share the one or more annotated messages within the first chat channel with a second chat channel for exchanging chat messages between a second plurality of client devices; and transmit, by the video conference provider to the second plurality of client devices, the one or more annotated messages for display on the second chat channel.

Example 14 is the system of any previous or subsequent Example, wherein the processor is further configured to execute processor-executable instructions stored in the non-transitory computer-readable medium to: identify, by the video conference provider, a first message of the one or more messages within the first chat channel corresponding to the indication; and the processor-executable instructions to generate, by the video conference provider, the one or more annotated messages within the first chat channel based on the indication cause the processor to further execute processor-executable instructions stored in the non-transitory computer-readable medium to perform one or more of: generate, by the video conference provider, a first annotated message comprising an indication of highlighting of content within the first annotated message; generate, by the video conference provider, a first flag for the first message within the first chat channel to provide quick access to the first message within the first chat channel; or generate, by the video conference provider, a tag associated with the first message for display within the first chat channel, wherein: the tag identifies a second client device to be associated with the first message; and the second client device is not associated with the first chat channel.

Example 15 is a non-transitory computer-readable medium comprising processor-executable instructions configured to cause one or more processors to: establish, by a video conference provider, a first chat channel for exchanging chat messages between a first plurality of client devices; receive, by the video conference provider, an indication to annotate one or more messages within the first chat channel; generate, by the video conference provider, one or more annotated messages within the first chat channel based on the indication; and store, by the video conference, the one or more annotated messages as associated with the first chat channel.

Example 16 is the non-transitory computer-readable medium of any previous or subsequent Example, wherein the processor is further configured to execute processor-executable instructions stored in the non-transitory computer-readable medium to: export, by the video conference provider, the one or more annotated messages from the first chat channel to an export file; and transmit, by the video conference provider, the export file comprising the one or more annotated messages from the first chat channel to a first client device.

Example 17 is the non-transitory computer-readable medium of any previous or subsequent Example, wherein the processor is further configured to execute processor-executable instructions stored in the non-transitory computer-readable medium to: identify, by the video conference provider, a first message of the one or more messages within the first chat channel corresponding to the indication; and the processor-executable instructions to generate, by the video conference provider, the one or more annotated messages within the first chat channel based on the indication cause the processor to further execute processor-executable instructions stored in the non-transitory computer-readable medium to perform one or more of: generate, by the video conference provider, a first annotated message comprising an indication of highlighting of content within the first annotated message; generate, by the video conference provider, a first flag for the first message within the first chat channel to provide quick access to the first message within the first chat channel; or generate, by the video conference provider, a tag associated with the first message for display within the first chat channel, wherein: the tag identifies a second client device to be associated with the first message; and the second client device is not associated with the first chat channel.

Example 18 is the non-transitory computer-readable medium of any previous or subsequent Example, wherein the indication is received from a first client device of the first plurality of client devices, and the processor is further configured to execute processor-executable instructions stored in the non-transitory computer-readable medium to: receive, by the video conference provider, a request to share the one or more annotated messages generated for the first client device with a second client device; and transmit, by the video conference provider, the one or more annotated messages for display on the second client device, wherein the second client device is not part of the first chat channel.

Example 19 is the non-transitory computer-readable medium of any previous or subsequent Example, wherein the processor is further configured to execute processor-executable instructions stored in the non-transitory computer-readable medium to: identify the one or more annotated messages stored by the video conference provider associated with the first chat channel; and transmit, by the video conference provider, the one or more annotated messages for display within the first chat channel to the first client device.

Example 20 is the non-transitory computer-readable medium of any previous or subsequent Example, wherein the processor is further configured to execute processor-executable instructions stored in the non-transitory computer-readable medium to: receive, from a first client device, a request to review the one or more annotated messages; and transmit, by the video conference provider to the first client device, a summary review of the one or more annotated messages for display on the first client device.

Example 21 is a method comprising: establishing, by a video conference provider, a first chat channel for exchanging chat messages between a plurality of client devices; receiving, by the video conference provider, an indication from a first client device to generate a note corresponding to one or more messages within the first chat channel, wherein the plurality of client devices comprises the first client device, wherein the indication comprises note content; generating, by the video conference provider, one or more notes comprising the note content corresponding to the one or more messages within the first chat channel based on the indication; and storing, by the video conference provider, the one or more notes corresponding to the one or more messages within the first chat channel.

Example 22 is the method of any previous or subsequent Example, the method further comprising: identifying the one or more notes stored by the video conference provider corresponding to the first chat channel; and transmitting, by the video conference provider, the one or more notes corresponding to the one or more messages within the first chat channel for display on a notetaking panel within the first chat channel.

Example 23 is the method of any previous or subsequent Example, the method further comprising: establishing, by the video conference provider, a second chat channel for exchanging chat messages between a second plurality of client devices, wherein the second plurality of client devices comprises the first client device; receiving, by the video conference provider, an indication from the first client device to generate a note corresponding to one or more messages within the second chat channel; generating, by the video conference provider, a second note comprising second note content corresponding to the one or more messages within the second chat channel based on the indication; and storing, by the video conference provider to the first client device, the second note comprising the second note content corresponding to the one or more messages in the second chat channel.

Example 24 is the method of any previous or subsequent Example, the method further comprising: identifying the second note stored by the video conference provider corresponding to the second chat channel; and transmitting, by the video conference provider, the second corresponding to the one or more messages within the second chat channel for display on the notetaking panel.

Example 25 is the method of any previous or subsequent Example, the method further comprising: exporting, by the video conference provider, the one or more notes from the notetaking panel to an export file; and providing, by the video conference provider, the export file to the first client device.

Example 26 is the method of any previous or subsequent Example, wherein: generating, by the video conference provider, the one or more notes comprising note content corresponding to the one or more messages within the first chat channel based on the indication further comprises: generating, by the video conference provider, a first note comprising first note content corresponding to a first message of the one or more messages within the first chat channel; and generating, by the video conference provider, a second note comprising second note content corresponding to a second message of the one or more messages within the first chat channel; and wherein the method further comprises: identifying the first note stored by the video conference provider corresponding to the first message; transmitting, by the video conference provider to the first client device, the first note for display proximate to the first message within the first chat channel; identifying the second note stored by the video conference provider corresponding to the second message; and transmitting, by the video conference provider to the first client device, the second note for display proximate to the second message within the first chat channel.

Example 27 is a system comprising: a non-transitory computer-readable medium; a communications interface; and a processor communicatively coupled to the non-transitory computer-readable medium and the communications interface, the processor configured to execute processor-executable instructions stored in the non-transitory computer-readable medium to: establish, by a video conference provider, a first chat channel for exchanging chat messages between a plurality of client devices; receive, by the video conference provider, an indication from a first client device to generate a note corresponding to one or more messages within the first chat channel, wherein the plurality of client devices comprises the first client device, wherein the indication comprises note content; generate, by the video conference provider, one or more notes comprising the note content corresponding to the one or more messages within the first chat channel based on the indication; and store, by the video conference provider, the one or more notes corresponding to the one or more messages within the first chat channel.

Example 28 is the system of any previous or subsequent Example, wherein the processor is further configured to execute processor-executable instructions stored in the non-transitory computer-readable medium to: identify the one or more notes stored by the video conference provider corresponding to the first chat channel; and transmit, by the video conference provider, the one or more notes corresponding to the one or more messages within the first chat channel for display on a notetaking panel within the first chat channel.

Example 29 is the system of any previous or subsequent Example, wherein the processor is further configured to execute processor-executable instructions stored in the non-transitory computer-readable medium to: receive, from the first client device, an indication that the first client device has left the first chat channel; receive, from the first client device, a request for the one or more notes within the notetaking panel; and transmit, by the video conference provider, the one or more notes to the first client device for display within the notetaking panel.

Example 30 is the system of any previous or subsequent Example, wherein the processor is further configured to execute processor-executable instructions stored in the non-transitory computer-readable medium to: receive, by the video conference provider from the first client device, a selection of the one or more notes within the notetaking panel; identify, by the video conference provider, the one or more messages from the first chat channel corresponding to the one or more notes; and transmit, by the video conference provider, an indication to display the one or more messages from the first chat channel to the first client device.

Example 31 is the system of any previous or subsequent Example, wherein the processor is further configured to execute processor-executable instructions stored in the non-transitory computer-readable medium to: receive, by the video conference provider, a request to share one or more notes generated for the first client device with a second client device; and transmit, by the video conference provider, the one or more notes and the corresponding messages from the first chat channel for display on the second client device.

Example 32 is the system of any previous or subsequent Example, wherein the second client device is not connected to the first chat channel.

Example 33 is the system of any previous or subsequent Example, wherein the processor is further configured to execute processor-executable instructions stored in the non-transitory computer-readable medium to: receive, by the video conference provider, a request to publish the one or more notes within the first chat channel for the plurality of client devices associated with the first chat channel; and transmit, by the video conference provider to the plurality of client devices connected to the first chat channel, the one or more notes for display within the first chat channel.

Example 34 is the system of any previous or subsequent Example, wherein the processor is further configured to execute processor-executable instructions stored in the non-transitory computer-readable medium to: receive, by the video conference provider, a request to share the one or more notes with a second chat channel for exchanging chat messages between a second plurality of client devices; and transmit, by the video conference provider to the second plurality of client devices, the one or more notes for display on the second chat channel.

Example 35 is a non-transitory computer-readable medium comprising processor-executable instructions configured to cause one or more processors to: establish, by a video conference provider, a first chat channel for exchanging chat messages between a plurality of client devices; receive, by the video conference provider, an indication from a first client device to generate a note corresponding to one or more messages within the first chat channel, wherein the plurality of client devices comprises the first client device, wherein the indication comprises note content; generate, by the video conference provider, one or more notes comprising the note content corresponding to the one or more messages within the first chat channel based on the indication; and store, by the video conference provider, the one or more notes corresponding to the one or more messages within the first chat channel.

Example 36 is the non-transitory computer-readable medium of any previous or subsequent Example, wherein the processor is further configured to execute processor-executable instructions stored in the non-transitory computer-readable medium to: identify the one or more notes stored by the video conference provider corresponding to the first chat channel; and transmit, by the video conference provider, the one or more notes corresponding to the one or more messages within the first chat channel for display on a notetaking panel within the first chat channel.

Example 37 is the non-transitory computer-readable medium of any previous or subsequent Example, wherein the processor is further configured to execute processor-executable instructions stored in the non-transitory computer-readable medium to: receive, by the video conference provider, an indication from the first client device to generate a second note comprising second note content corresponding to a second message within a second chat channel, wherein the second chat channel exchanges messages between a second plurality of client devices; generate, by the video conference provider, the second note comprising the second note content corresponding to the second message within the second chat channel based on the indication; and store, by the video conference provider, the second note corresponding to the second message within the second chat channel.

Example 38 is the non-transitory computer-readable medium of any previous or subsequent Example, wherein the processor is further configured to execute processor-executable instructions stored in the non-transitory computer-readable medium to: receive, by the video conference provider, an indication from the first client device to view the notetaking panel; identify, by the video conference provider, the second note corresponding to the second message within the second chat channel; and transmit, by the video conference provider, the second note to the first client device for display in the notetaking panel.

Example 39 is the non-transitory computer-readable medium of any previous or subsequent Example, wherein the processor is further configured to execute processor-executable instructions stored in the non-transitory computer-readable medium to: export, by the video conference provider, the one or more notes and the second note from the notetaking panel to an export file; and provide, by the video conference provider, the export file to the first client device.

Example 40 is the non-transitory computer-readable medium of any previous or subsequent Example, wherein the processor is further configured to execute processor-executable instructions stored in the non-transitory computer-readable medium to: receive, by the video conference provider from the first client device, a selection of the second note within the notetaking panel; and transmit, by the video conference provider, an indication to display the second message within the second chat channel to the first client device.

The invention claimed is:

1. A method comprising:
   establishing, by a video conference provider, first and second chat channels, the first chat channel for exchanging chat messages between a first plurality of client devices, the second chat channel for exchanging chat messages between a second plurality of client devices;
   receiving, by the video conference provider, an indication from a first client device to generate a first note corresponding to one or more messages within the first chat channel, wherein the first plurality of client devices comprises the first client device, wherein the indication comprises first note content;
   receiving, by the video conference provider, an indication from a first client device to generate a second note corresponding to one or more messages within the second chat channel, wherein the second plurality of client devices comprises the first client device, wherein the indication comprises second note content;
   generating, by the video conference provider, one or more first notes comprising the first note content corresponding to the one or more messages within the first chat channel based on the indication;
   generating, by the video conference provider, one or more second notes comprising the second note content corresponding to the one or more messages within the second chat channel based on the indication;
   storing, by the video conference provider, the one or more first notes corresponding to the one or more messages within the first chat channel and the one or more second notes corresponding to the one or more messages within the second chat channel;
   receiving a request for notes associated with the first and second chat channel;
   identifying the one or more first and second notes stored by the video conference provider corresponding to the first and second chat channels;
   providing the one or more first notes and the one or more second notes; and
   transmitting, by the video conference provider, the one or more first notes corresponding to the one or more messages within the first chat channel for display on a notetaking panel within the first chat channel.

2. The method of claim 1, the method further comprising:
   identifying the second note stored by the video conference provider corresponding to the second chat channel; and
   transmitting, by the video conference provider, the second corresponding to the one or more messages within the second chat channel for display on the notetaking panel.

3. The method of claim 1, the method further comprising:
   exporting, by the video conference provider, the one or more first notes from the notetaking panel to an export file; and
   providing, by the video conference provider, the export file to the first client device.

4. The method of claim 1, wherein:
   generating, by the video conference provider, the one or more first notes comprising note content corresponding to the one or more messages within the first chat channel based on the indication further comprises:
   generating, by the video conference provider, a third note comprising third note content corresponding to a first message of the one or more messages within the first chat channel; and
   generating, by the video conference provider, a fourth note comprising fourth note content corresponding to a second message of the one or more messages within the first chat channel; and
   and wherein the method further comprises:
   identifying the third note stored by the video conference provider corresponding to the first message;
   transmitting, by the video conference provider to the first client device, the third note for display proximate to the first message within the first chat channel;
   identifying the fourth note stored by the video conference provider corresponding to the second message; and
   transmitting, by the video conference provider to the first client device, the fourth note for display proximate to the second message within the first chat channel.

5. A system comprising:
   a non-transitory computer-readable medium;
   a communications interface;
   and a processor communicatively coupled to the non-transitory computer-readable medium and the communications interface, the processor configured to execute processor-executable instructions stored in the non-transitory computer-readable medium to:
   establish, by a video conference provider, s-first and second chat channels the first chat channel for exchanging chat messages between a first plurality of client devices, the second chat channel for exchanging chat messages between a second plurality of client devices;
   receive, by the video conference provider, an indication from a first client device to generate a first note corresponding to one or more messages within the first chat channel, wherein the first plurality of client devices comprises the first client device, wherein the indication comprises first note content;
   receive, by the video conference provider, an indication from a first client device to generate a second note corresponding to one or more messages within the second chat channel, wherein the second plurality of client devices comprises the first client device, wherein the indication comprises second note content;
   generate, by the video conference provider, one or more first notes comprising the first note content corresponding to the one or more messages within the first chat channel based on the indication;

generate, by the video conference provider, one or more second notes comprising the second note content corresponding to the one or more messages within the second chat channel based on the indication;

store, by the video conference provider, the one or more first notes corresponding to the one or more messages within the first chat channel and the one or more second notes corresponding to the one or more messages within the second chat channel;

receive a request for notes associated with the first and second chat channel;

identify the one or more first and second notes stored by the video conference provider corresponding to the first and second chat channels;

provide the one or more first notes and the one or more second notes and transmit, by the video conference provider, the one or more first notes corresponding to the one or more messages within the first chat channel for display on a notetaking panel within the first chat channel.

6. The system of claim 5, wherein the processor is further configured to execute processor-executable instructions stored in the non-transitory computer-readable medium to:
receive, from the first client device, an indication that the first client device has left the first chat channel;
receive, from the first client device, a request for the one or more first notes within the notetaking panel; and
transmit, by the video conference provider, the one or more first notes to the first client device for display within the notetaking panel.

7. The system of claim 5, wherein the processor is further configured to execute processor-executable instructions stored in the non-transitory computer-readable medium to:
receive, by the video conference provider from the first client device, a selection of the one or more first notes within the notetaking panel;
identify, by the video conference provider, the one or more messages from the first chat channel corresponding to the one or more first notes; and
transmit, by the video conference provider, an indication to display the one or more messages from the first chat channel to the first client device.

8. The system of claim 5, wherein the processor is further configured to execute processor-executable instructions stored in the non-transitory computer-readable medium to:
receive, by the video conference provider, a request to share one or more notes generated for the first client device with a second client device; and
transmit, by the video conference provider, the one or more notes and the corresponding messages from the first chat channel for display on the second client device.

9. The system of claim 8, wherein the second client device is not connected to the first chat channel.

10. The system of claim 5, wherein the processor is further configured to execute processor-executable instructions stored in the non-transitory computer-readable medium to:
receive, by the video conference provider, a request to publish the one or more first notes within the first chat channel for the plurality of client devices associated with the first chat channel; and
transmit, by the video conference provider to the plurality of client devices connected to the first chat channel, the one or more first notes for display within the first chat channel.

11. The system of claim 5, wherein the processor is further configured to execute processor-executable instructions stored in the non-transitory computer-readable medium to:
receive, by the video conference provider, a request to share the one or more first notes with a second chat channel for exchanging chat messages between a second plurality of client devices; and
transmit, by the video conference provider to the second plurality of client devices, the one or more first notes for display on the second chat channel.

12. A non-transitory computer-readable medium comprising processor-executable instructions configured to cause one or more processors to:
establish, by a video conference provider, a first and second chat channels, the first chat channel for exchanging chat messages between a first plurality of client devices, the second chat channel for exchanging chat messages between a second plurality of client devices;
receive, by the video conference provider, an indication from a first client device to generate a first note corresponding to one or more messages within the first chat channel, wherein the first plurality of client devices comprises the first client device, wherein the indication comprises first note content;
receive, by the video conference provider, an indication from a first client device to generate a second note corresponding to one or more messages within the second chat channel, wherein the second plurality of client devices comprises the first client device, wherein the indication comprises second note content;
generate, by the video conference provider, one or more first notes comprising the first note content corresponding to the one or more messages within the first chat channel based on the indication;
generate, by the video conference provider, one or more second notes comprising the second note content corresponding to the one or more messages within the second chat channel based on the indication;
store, by the video conference provider, the one or more first notes corresponding to the one or more messages within the first chat channel and the one or more second notes corresponding to the one or more messages within the second chat channel;
receive a request for notes associated with the first and second chat channel;
identify the one or more first and second notes stored by the video conference provider corresponding to the first and second chat channels;
provide the one or more first notes and the one or more second not
and transmit, by the video conference provider, the one or more first notes corresponding to the one or more messages within the first chat channel for display on a notetaking panel within the first chat channel.

13. The non-transitory computer-readable medium of claim 12, wherein the processor is further configured to execute processor-executable instructions stored in the non-transitory computer-readable medium to:
receive, by the video conference provider, an indication from the first client device to view the notetaking panel;

identify, by the video conference provider, the second note corresponding to a second message within the second chat channel;

and transmit, by the video conference provider, the second note to the first client device for display in the notetaking panel.

14. The non-transitory computer-readable medium of claim 13, wherein the processor is further configured to execute processor-executable instructions stored in the non-transitory computer-readable medium to:

export, by the video conference provider, the one or more first notes and the second note from the notetaking panel to an export file; and provide, by the video conference provider, the export file to the first client device.

15. The non-transitory computer-readable medium of claim 13, wherein the processor is further configured to execute processor-executable instructions stored in the non-transitory computer-readable medium to:

receive, by the video conference provider from the first client device, a selection of the second note within the notetaking panel; and transmit, by the video conference provider, an indication to display the second message within the second chat channel to the first client device.

* * * * *